United States Patent [19]
Erhage

[11] Patent Number: 6,127,966
[45] Date of Patent: Oct. 3, 2000

[54] METHOD AND DEVICE FOR ANTENNA CALIBRATION

[75] Inventor: Lars Ingemar Erhage, Göteborg, Sweden

[73] Assignee: Telefonaktiebolaget LM Ericsson, Stockholm, Sweden

[21] Appl. No.: 09/079,854

[22] Filed: May 15, 1998

[30] Foreign Application Priority Data

May 16, 1997 [SE] Sweden .................................. 9701846

[51] Int. Cl.[7] ................................. G01S 7/40; H01Q 3/00
[52] U.S. Cl. ......................... 342/174; 342/165; 342/173; 342/368
[58] Field of Search ..................... 342/165, 168, 342/169, 170, 171, 172, 173, 174, 368, 369, 370, 371, 372, 373, 374, 375, 376, 377

[56] References Cited

U.S. PATENT DOCUMENTS

| | | |
|---|---|---|
| 4,517,570 | 5/1985 | Gray, Jr. . |
| 4,532,518 | 7/1985 | Gaglione et al. . |
| 4,994,813 | 2/1991 | Shiramatsu et al. . |
| 5,003,314 | 3/1991 | Berkowitz et al. . |
| 5,063,529 | 11/1991 | Chapoton . |
| 5,081,460 | 1/1992 | Liu ......................................... 342/169 |
| 5,253,188 | 10/1993 | Lee et al. . |
| 5,294,934 | 3/1994 | Matsumoto . |
| 5,477,229 | 12/1995 | Caille et al. . |
| 5,530,449 | 6/1996 | Wachs et al. . |

FOREIGN PATENT DOCUMENTS

| | | |
|---|---|---|
| 0496381 | 7/1992 | European Pat. Off. . |
| 2171849 | 9/1986 | United Kingdom . |

*Primary Examiner*—Bernarr E. Gregory
*Attorney, Agent, or Firm*—Burns, Doane, Swecker & Mathis, L.L.P.

[57] ABSTRACT

The present invention relates to the problem of calibrating an antenna system (23) comprising an electrically controlled antenna (25) using a test antenna (45) arranged near the electrically controlled antenna, with the possibility of calibrating during operation, when disturbing reflections or other unknown signal influences are present when signals are transmitted between the test antenna and the electrically controlled antenna or between the electrically controlled antenna and the test antenna. The electrically controlled antenna comprises a number of modules (27-(1-N)) having means (91-(1-N)) for controlling the complex amplification of the modules. Each module is arranged with a commandable reference mode at reception and/or transmission. The antenna system is calibrated for reception and transmission, respectively, by transmitting test signals between the test antenna and the electrically controlled antenna and/or by transmitting test signals between the electrically controlled antenna and the test antenna, the effect of the unknown signal influence being eliminated by utilization of the reference modes at reception and/or transmission.

56 Claims, 9 Drawing Sheets

METHOD AND DEVICE FOR ANTENNA CALIBRATION

This application claims priority under 35 U.S.C. §§119 and/or 365 to SE 9701846-9 filed in Sweden on May 16, 1997; the entire content of which is hereby incorporated by reference.

TECHNICAL FIELD

The present invention is related to devices and methods for antenna calibration. In particular the invention is related to calibration of antenna systems comprising electrically controlled antennas.

DESCRIPTION OF RELATED ART

Many technical applications comprise some form of antenna function, in which signals are to be received or transmitted through air. Examples of such applications are radios, television sets, mobile telephony systems and radar systems.

The demand for directional function in an antenna varies with the application. A radio is to be able to receive signals from different radio stations independently of where it has been placed, and the antenna should therefore preferably be equally sensitive in all directions in the horizontal plane. A television set, on the other hand, should only be sensitive to signals coming from the nearest television mast. The antenna of a television set should therefore be arranged in such a way that it is particularly sensitive to signals coming from a particular direction, and signals coming from other directions should be suppressed to the greatest degree possible. A radar is usually to both transmit and receive in a certain direction, and it should also be possible to change this direction so that the radar can obtain information about the surroundings in different directions. For radar also it is desirable that the antenna suppress signals from other directions than the direction in which the radar is currently transmitting and receiving.

One type of antenna having a directional function is the so-called reflector antenna. A reflector antenna comprises a conducting reflector, positioned behind the antenna element itself. The dimensions of the reflector should be considerably greater than the wave-length of the signals used for the application concerned. The reflector is shaped in such a way that it superimposes signals incoming in a certain direction. The sensitivity direction of the antenna can be changed by mechanically redirecting the antenna. The most common reflector antenna is probably the dish antenna. The reflector of a dish antenna functions as a parabolic mirror, concentrating waves incoming parallel to the main axis of the dish to the focus of the dish. In the focus of the dish the antenna element, usually a horn antenna is placed.

Another type of antenna having a decided directional function is the so-called electrically controlled antenna. An electrically controlled antenna comprises a number of modules, usually arranged in a row or in a matrix pattern. The number of modules can vary very much depending on the application concerned. Each module usually comprises one antenna element.

At transmission of a signal from an electrically controlled antenna the signal is divided into a number of sub-signals of equal size, and each sub-signal is fed to one of the modules. The modules comprise signal channels guiding the sub-signals to the antenna elements. Each signal channel comprises controllable attenuators (alternatively controllable amplifiers) and controllable phase-shifting devices for controlling the amplification and the phase shift of the modules. The signals transmitted through the antenna elements interfere with each other. By selecting suitable values of the relative amplification and the relative phase-shifting between the modules and by utilizing the interference of the transmitted signals, the directional sensitivity—the antenna diagram—of the antenna can be controlled. When the directional sensitivity of the antenna is to be redirected, only the amplification and the phase-shifting of the modules have to be changed. The change of the amplification and the phase-shifting can be done electronically so that no mechanical redirection of the antenna has to be carried out.

During reception in an electrically controlled antenna, the opposite procedure takes place compared to transmission. Each antenna element receives a sub-signal. The modules comprise signal channels for reception and through these signal channels the sub-signals are transmitted to an addition point in which all sub-signals are added to form one signal. The signal channels for reception also comprise amplifiers and phase shifters, and the directional sensitivity of the antenna for reception can be controlled in a corresponding way as for transmission, by varying the amplification and phase-shifting of the modules.

Modules enabling both transmission and reception are normally called T/R modules (Transmitter/Receiver modules).

As previously mentioned, for some applications it is desirable that the antenna transmit or receive in a particular direction while signals in other directions are suppressed to as great a degree as possible. For transmission it is usually desirable to concentrate the transmitted signal as much as possible and for reception to avoid disturbing signals from the adjacent directions. These properties are usually summed up in that the side lobe levels of the antenna are to be as low as possible.

To enable low side lobe levels with an electrically controlled antenna, requirements are made i.a. on the size (area) of the antenna and the accuracy of the amplification and the phase shift in the modules. To achieve a high accuracy in the properties of the modules, either high demands must be made on the components of the modules or some kind of calibration function must be introduced in the antenna system.

In patent literature there are a number of descriptions of electrically controlled antennas that may be calibrated and methods for calibrating them.

Calibration of electrically controlled antennas is discussed, for example, in the patent specifications U.S. Pat. Nos. 5,063,529, 4,532,518 and U.S. Pat. No. 4,994,813. These patent specifications are based on the injection of a known test signal. The test signal is distributed by means of a calibration network and is inserted separately in all the T/R modules. Alternatively, the test signal is generated in a calibration horn positioned in front of the antenna.

The amplification and phase shift of the T/R modules are obtained by considering the change in amplitude and phase of the test signal when it passes the T/R module. The control signals controlling the attenuators and the phase shifters in the T/R modules can now be corrected so that the amplification and the phase-shifting are made to coincide with the commanded (desired) amplification and phase-shifting.

The method of using a calibration horn work well in stationary ground system since a calibration horn in such a system can relatively easily be placed in the remote field, the position of the horn relative to the antenna be measured and the calibration be performed. In, for example, an airplane radar such an arrangement is of course impossible if it is to be possible to calibrate during operation.

If the horn is instead placed at a nearfield distance from the antenna, the position of the horn relative to the antenna must be known with a high accuracy, in order for the test signals inserted in the T/R modules to have a known amplitude and phase. Also this places strict requirements that no signals be reflected back to the antenna from the surrounding. This is not fulfilled, for example, in an airplane radar in which reflection from radome and other parts of the airplane can occur. It is generally impossible to predict the influence of these reflections and this type of calibration is therefore not suitable, for example, for an airplane radar.

The method of providing the antenna with an extra calibration network functions well even in, for example, an airplane radar. The disadvantage of this solution is the high complexity implied by the distribution network, in particular in the cases when the antenna comprises a large number (thousands) of T/R modules.

SUMMARY OF THE INVENTION

The present invention relates to solving the problem of calibrating an antenna system comprising an electrically controlled antenna utilizing a test antenna arranged near the electrically controlled antenna, with the possibility of calibration during operation when disturbing reflections or other unknown signal influences are present when signals are transmitted between the test antenna and the electrically controlled antenna or between the electrically controlled antenna and the test antenna.

The problem formulated above is generally solved according to the following. The electrically controlled antenna comprises a number of modules having control means for controlling the amplification and phase-shifting of the modules at reception or transmission. The phase-shifting and the amplification at reception or transmission for each module in relation to the other modules are to coincide with a commanded phase-shifting and a commanded amplification at reception or transmission for the module. The calibration of the antenna system is to make sure that this is fulfilled. The antenna system is calibrated on the basis of an investigation of the phase-shifting and amplification of the modules at reception or transmission. The phase-shiftings and the amplification s at reception or transmission for the modules are investigated by test signals being transmitted through the test antenna and received through the electrically controlled antenna and/or through the transmission of test signals through the electrically controlled antenna and the reception through the test antenna, whereby received signals, corresponding to the test signals, are obtained. The received signals generally have an amplitude and a phase that are different from the amplitude and the phase of the test signals. This difference is caused to some degree by the phase-shiftings and the amplifications at reception or transmission for the modules, but generally also depends on other signal influences. If such an other signal influence, for example, as a result of reflections from the surroundings during signal transmission between the test antenna and the electrically controlled antenna, is unknown, it is impossible with any accuracy to determine the phase-shifting and the amplification at transmission or reception for the modules based on a comparison between the test signals and the received signals. According to the invention, therefore, it is suggested that each module be arranged with a commandable reference mode at reception, at which the phase-shifting and amplification of the module at reception are known.

Utilizing the reference modes at reception, information about the unknown signal influence can be obtained so that the effects of the unknown signal influence at calibration can be eliminated. Each of the modules can also be arranged with a reference mode at transmission, in which the phase-shifting and amplification of the module at transmission are known. Information about the unknown signal influence can then, in a corresponding way, be obtained utilizing the reference modes at transmission. Each module is also arranged with a commandable isolated mode, in which the module does not let any signals through. Phase-shifting and amplification can thus be investigated separately for each module by commanding the other modules to their isolated modes.

Thus, the object of the invention is to calibrate the antenna system by investigating the phase-shifting and amplification of the modules during reception and/or transmission utilizing test signals, whereby the effects of the unknown signal influences on the test signals can be eliminated by utilization of the reference modes during reception or transmission. The invention comprises devices and methods to achieve these objects.

The above formulated problem is solved more specifically according to the following. A way of arranging the modules with reference modes at reception is to make a survey of the phase-shifting and amplification of the modules during reception as a function of the temperature and frequency for predetermined settings of the control signals controlling the control means for controlling the phase-shifting and amplification of the modules during reception. Data corresponding to these surveys is stored in memory means in the antenna system. The antenna system is arranged with temperature-measuring means. As the antenna system can then measure the temperature, the phase-shiftings and amplifications of the modules during reception are known for the predetermined settings of the control signals, whereby the reference modes for reception have been obtained. Another way of arranging the modules with reference modes at reception is arranging the modules in such a way that the electronic circuitry in each module can be bypassed on command by a reference means, for example a transmission conductor. The phase-shifting and amplification of the modules during reception are determined in such a situation mainly by the phase-shifting and amplification of the reference means. The phase-shifting and amplification of the modules during reception are surveyed when the reference means is connected as a function of the temperature and frequency. The antenna system is arranged with temperature-measuring means. As the temperature can be measure by the antenna system, the phase-shifting and amplification during reception for the modules are known when the reference means are connected, whereby the reference modes at reception are obtained. According to the invention it is suggested how the antenna system can be calibrated during reception when the modules have been arranged with reference modes at reception. According to the invention it is also suggested how the antenna system can be calibrated in transmission when the modules have been arranged with reference modes at reception. The modules can be arranged with reference modes at transmission in a corresponding way as at reception. According to the invention it is suggested how the antenna system can be calibrated in transmission when the modules have been arranged with reference modes at transmission. According to the invention it is also suggested how the antenna system can be calibrated at reception when the modules have been arranged with reference modes at transmission.

The invention has the advantage that the antenna system can be calibrated with relatively simple means.

The invention will be described in more detail in the following by means of preferred embodiments and with reference to the enclosed drawings.

DESCRIPTION OF PREFERRED EMBODIMENTS

Figure 1:
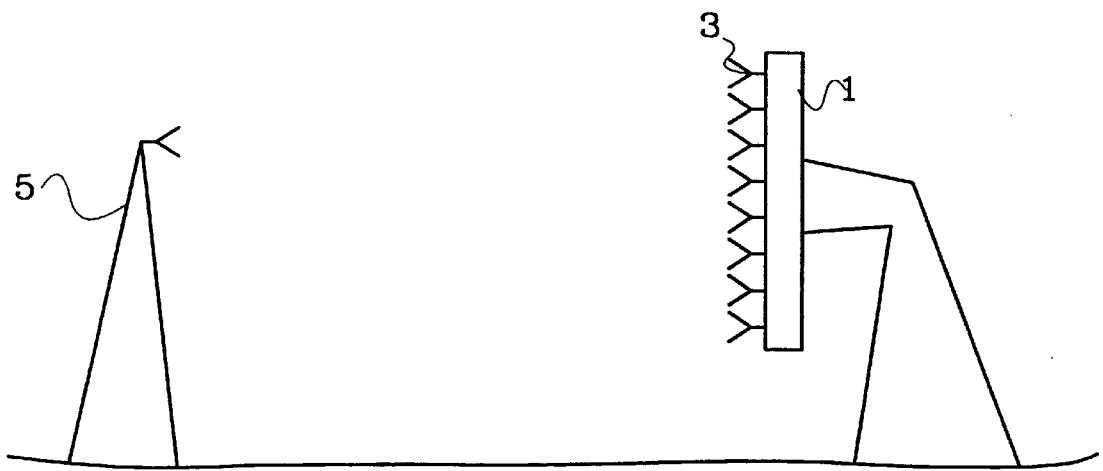
FIG. 1 shows a principle sketch of the calibration of an electrically controlled antenna according to prior art.

FIG. 1 shows how calibration of an electrically controlled antenna 1 can be carried out according to prior art. A test antenna 5 is placed at a remote field distance from the electrically controlled antenna 1. The position of the test antenna 5 relative to the electrically controlled antenna 1 is accurately measured. The test antenna 5 and the electrically controlled antenna 1 are positioned in such a way as to minimize the reflections occurring from the surroundings.

At calibration during reception a test signal is transmitted from the test antenna 5 and received through the electrically controlled antenna 1. The way in which the test antenna 5 is arranged in FIG. 1 makes it possible to determine the phase and the amplitude of the signals inserted into the radiation elements 3 of the electrically controlled antenna 1 relatively accurately. By measuring the phase and the amplitude of the signal received through the electrically controlled antenna 1, it is thus possible to obtain information about the actual phase-shifting and amplification of the modules. The actual phase-shifting and amplification are compared to the desired phase-shifting and amplification, and a switching of the control signals to the phase shifters and attenuators of the modules can be performed based on this comparison. The configuration shown in FIG. 1 can also be used to calibrate the electrically controlled antenna 1 during transmission. The test signal is then transmitted from the electrically controlled antenna 1 and received through the test antenna 5; the calibration is in all other respects carried out in a corresponding way as with calibration during reception.

Figure 2:
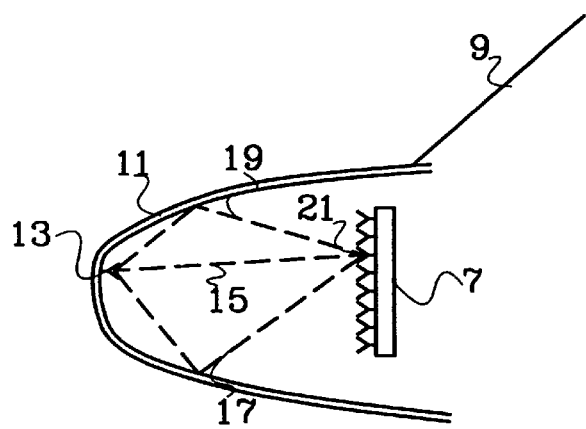
FIG. 2 shows a principle sketch of an attempt to calibrate an electrically controlled antenna during operation in a moving application.

In a moving application, such as, for example, a radar in an airplane, the ideal conditions valid for the calibration described in FIG. 1 do not exist. In FIG. 2, an attempt to calibrate an electrically controlled antenna 7 in an airplane 9 is shown. The electrically controlled antenna 7 is here arranged in a radome 11 in the nose of the airplane 9. A test antenna 13 is also arranged in the radome 11. The test antenna 13 in FIG. 2 is much closer to the electrically controlled antenna 7 than was the case in FIG. 1, which poses stricter requirements on the determination of the position of the test antenna 13 relative to the electrically controlled antenna 7. When a test signal is transmitted from the test antenna 13 in FIG. 2, reflections causing problems will arise in the radome 11. A signal received through any of the radiation elements 21 of the electrically controlled antenna 7 will therefore be combined by a direct signal 15 as well as a number of reflected signals 17 and 19. Thus, the signals received through the radiation elements 21 are not fully known, which reduces or prevents the calibration ability of the system in FIG. 2. On the whole, this causes the configuration shown in FIG. 2 to be unsuitable for a moving application in which calibration is to be carried out during operation. Therefore, more complicated solutions are normally needed for such applications.

The present invention is now to be described, with reference to FIGS. 3 to 10.

Figure 3:
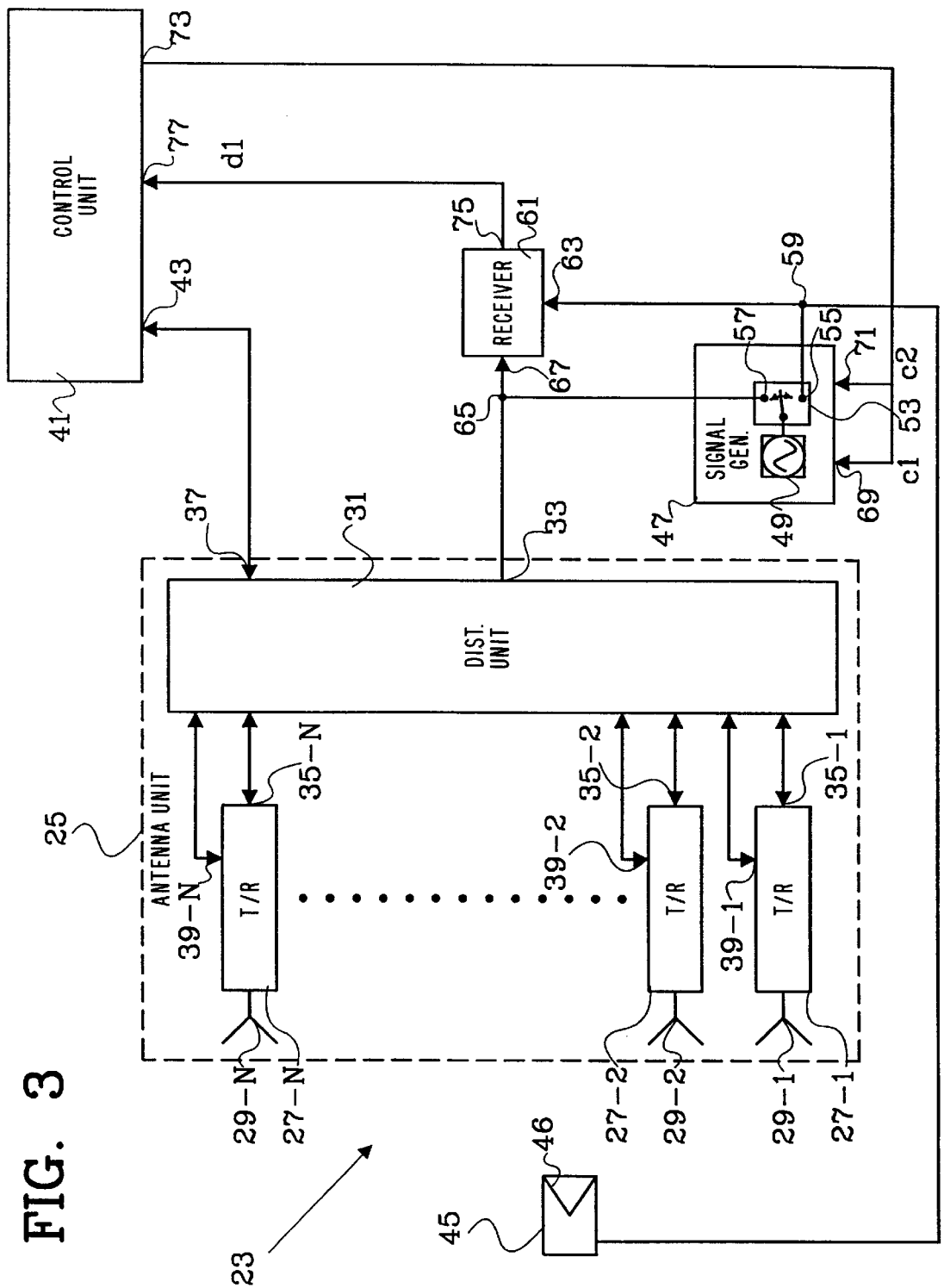
FIG. 3 is a block diagram of a construction of an antenna system.

FIG. 3 shows an antenna system 23 in accordance with the present invention. The antenna system of FIG. 3 can, for example, be conceived to be part of a radar.

The antenna system in FIG. 3 comprises an antenna unit 25, which is an electrically controlled antenna. The antenna unit 25 comprises a number of T/R modules 27-(1-N), each in turn comprising radiation elements 29-(1-N), through which signals can be transmitted or received.

The antenna unit 25 further comprises a distribution unit 31. The distribution unit 31 comprises an analogue distribution connection 33 connected to a bidirectional analogue distribution net situated in the distribution unit—not shown in FIG. 3. The analogue distribution network connects the analogue distribution connection 33 to analogue signal connections 35-(1-N) in each T/R module 27-(1-N). Signals to be transmitted through the antenna unit 31 are thus fed to the distribution connection 33 and distributed by the analogue distribution network to the analogue signal connec-tions 35-(1-N) of the T/R modules 27-(1-N). During reception, signals are supplied to the analogue distribution network from the analogue signal connections 35-(1-N) of the T/R modules 27-(1-N), and these signals are added by the analogue distribu-tion network to a sum signal, which is fed to the analogue distribution connection 33. The sum signal thus constitutes the signal received through the antenna unit 25.

The distribution unit 31 also comprises digital distribution connections for digital communication to and from the T/R modules—the digital distribution connections being collectively referred to by reference numeral 37 in FIG. 3. The distribution unit 31 comprises a first digital distribution network—not shown in FIG. 3—for digital signal transfer to the T/R modules 27-(1-N). The first digital distribution network distributes digital signals from the digital distribution connections 37 to digital input signal connections in the T/R modules 27-(1-N). The distribution unit 31 also comprises a second digital distribution network—not shown in FIG. 3—which transfers digital signals from digital output output signal connections in the T/R modules 27-(1-N) to the digital distribution connections 37. The digital input signal and output signal connections for each T/R module 27-(1-N) are collectively referred to by reference numeral 39-(1-N) in FIG. 3.

The antenna system 23 in FIG. 3 further comprises a control unit 41 for controlling the antenna system 23. The control unit 41 comprises digital input signal and output signal connections, collectively referred to by reference numeral 43 in FIG. 3. The digital input signal and output signal connections 43 of the control unit 41 are connected to the digital distribution connections 37. Bidirectional digital communication channels are in this way established between the control unit 41 and the T/R modules 27-(1-N). The digital communication channels are utilized by the control unit 41 for control and supervision of the work of the T/R modules 27-(1-N).

Figure 4:
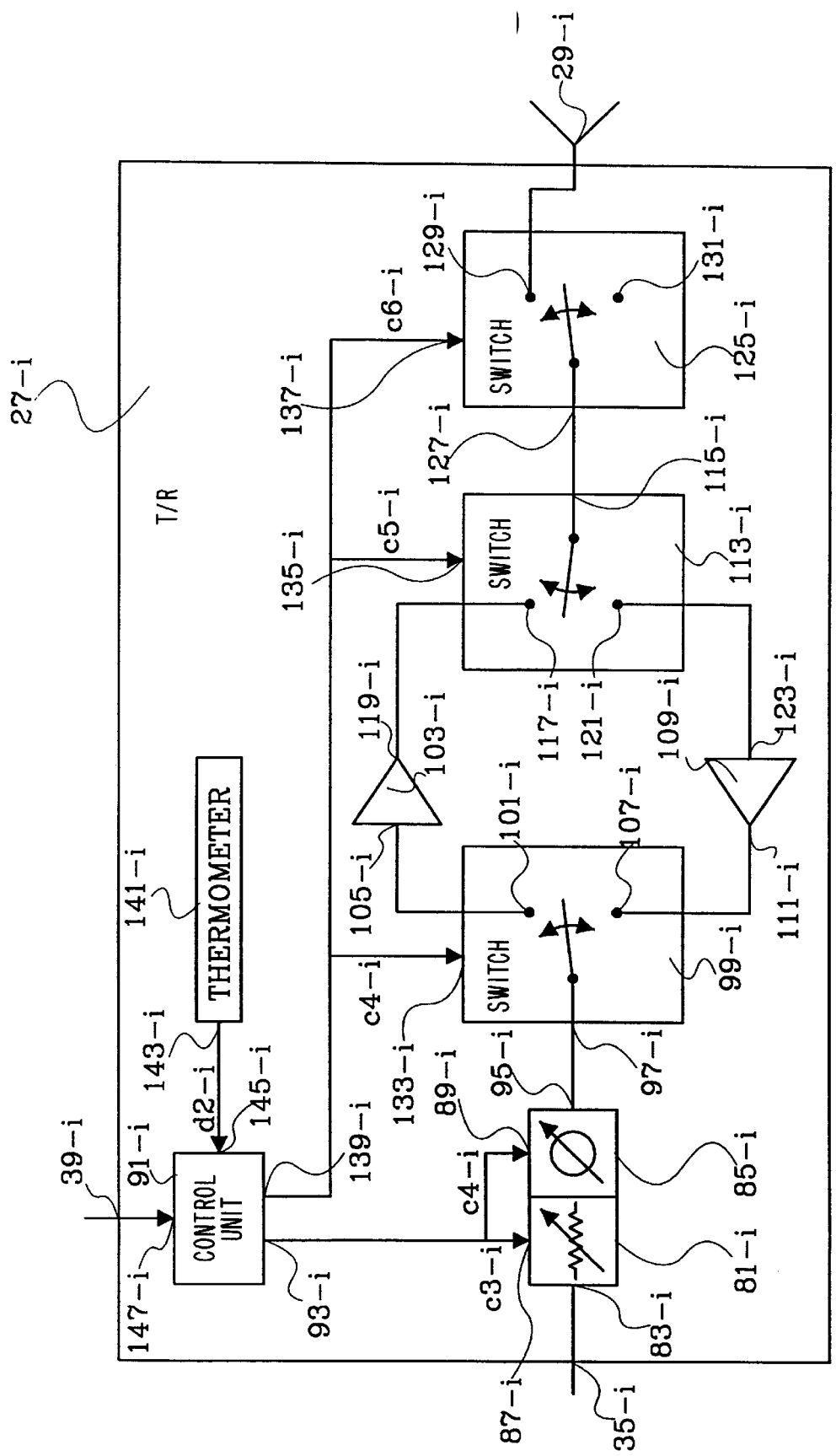
FIG. 4 is a block diagram of a construction of a T/R module.

FIG. 4 shows, by means of an example, a construction of the T/R modules 27-(1-N) of the antenna system 23 in FIG. 3. The T/R module in FIG. 4, as an example, T/R module No. i 27-$i$, comprises an analogue signal connection 35-$i$ and radiation element 29-$i$. The T/R module 27-$i$ in FIG. 4 has functions for reception and transmission.

The analogue signal connection 35-$i$ of the T/R module 27-$i$ in FIG. 4 is connected to a signal connection 83-$i$ of a controllable attenuator 81-$i$. The controllable attenuator 81-$i$ is followed by a controllable phase shifter 85-$i$. The controllable attenuator 81-$i$ and the controllable phase shifter 85-$i$ comprises control signal inputs 87-$i$ and 89-$i$ for receiving control signals c3-$i$ and c4-$i$. The control signal inputs 87-$i$ and 89-$i$ of the controllable attenuator 81-$i$ and the controllable phase shifter 85-$i$ are connected to a corresponding first set of control signal outputs 93-$i$ of a control unit 91-$i$ belonging to the T/R module 27-$i$. The control unit 91-$i$ is thus arranged to control the controllable attenuator 81-$i$ and the controllable phase shifter 85-$i$.

A signal connection 95-$i$ of the controllable phase shifter 85-$i$ is connected to a signal connection 97-$i$ of a first controllable switch 99-$i$. The first controllable switch 99-$i$ can be set to a first position 101-$i$, whereby the signal connection 97-$i$ of the first controllable switch 99-$i$ is connected to an input 105-$i$ of a first amplifier 103-$i$. The first controllable switch 99-$i$ can also be set to a second position 107-$i$, whereby the signal connection 97-$i$ of the first controllable switch 99-$i$ is connected to an output 111-$i$ of a second amplifier 109-$i$.

The T/R module 27-$i$ in FIG. 4 further comprises a second controllable switch 113-$i$ having a signal connection 115-$i$. The second controllable switch 113-$i$ can be set to a first position 117-$i$, whereby the signal connection 115-$i$ of the second controllable switch 113-$i$ is connected to an output 119-$i$ of the first amplifier 103-$i$. The second controllable switch 113-$i$ can also be set to a second position 121-$i$, whereby the signal connection 115-$i$ of the second controllable switch 113-$i$ is connected to an input 123-$i$ of the second amplifier 109-$i$.

The T/R module 27-$i$ in FIG. 4 further comprises a third controllable switch 125-$i$ having a signal connection 127-$i$. The third controllable switch 125-$i$ can be set to a first position 129-$i$, whereby the signal connection 127-$i$ of the third controllable switch 125-$i$ is connected to the radiation element 29-$i$ of the T/R module 27-$i$. The third controllable switch 125-$i$ can also be set to a second position 131-$i$, whereby the radiation element 29-$i$ of the T/R module 27-$i$ is isolated in such a way that signals can neither pass to nor from the radiation element 29-$i$. When the third controllable switch 125-$i$ is in its second position 131-$i$, in this description it is said that the T/R module 27-$i$ is in its isolated mode. The signal connection 127-$i$ of the third controllable switch 125-$i$ is connected to the signal connection 115-$i$ of the second controllable switch 113-$i$.

The three controllable switches 99-$i$, 113-$i$ and 125-$i$ comprise control signal inputs 133-$i$, 135-$i$ and 137-$i$, connected to a corresponding second set of control signal outputs 139-$i$ in the control unit 91-$i$ of the T/R module 27-$i$. The control unit 91-$i$ is in this case arranged to control the positions 101-$i$, 107-$i$, 117-$i$, 121-$i$, 129-$i$ and 131-$i$ of the three controllable switches 99-$i$, 113-$i$ and 125-$i$, and this is done by means of control signals c4-$i$, c5-$i$ and c6-$i$.

In the T/R module 27-$i$ in FIG. 4, a signal channel for transmission can be established by setting the three controllable switches 99-$i$, 113-$i$ and 125-$i$ to their first positions 101-$i$, 117-$i$ and 129-$i$. A signal coming into the T/R module 27-$i$ through the analogue signal connection 35-$i$ of the T/R module in such a situation will then be transferred to the radiation element 29-$i$ through the following elements in the order stated: the controllable attenuator 81-$i$, the controllable phase shifter 85-$i$, the first controllable switch 99-$i$, the first amplifier 103-$i$, the second controllable switch 113-$i$ and the third controllable switch 125-$i$.

In the T/R module 27-$i$ in FIG. 4, a signal channel for reception can also be established, by setting the first and the second controllable switch 99-$i$ and 113-$i$ to their second positions 107-$i$ and 121-$i$, while the third controllable switch 125-$i$ remains in its first position 129-$i$. A signal received through the radiation element 29-$i$ is in such a situation transferred to the analogue signal connection 35-$i$ of the T/R module 27-$i$ through the following elements in the order stated: the third controllable switch 125-$i$, the second controllable switch 113-$i$, the second amplifier 123-$i$, the first controllable switch 99-$i$, the controllable phase shifter 85-$i$ and the controllable attenuator 81-$i$.

The T/R module 27-$i$ in FIG. 4 further comprises a thermometer 141-$i$. The thermometer 141-$i$ is arranged to measure the temperature in the T/R module 27-$i$ and emit, through a detector signal output 143-$i$, a temperature detector signal d2-$i$ corresponding to the measured temperature. The detector signal output 143-$i$ of the thermometer 141-$i$ is connected to a corresponding detector signal input 145-$i$ in the control unit 91-$i$ of the T/R module.

The control unit 91-$i$ in FIG. 4 comprises digital input signal and output signal connections 147-$i$, connected to the digital input signal and output signal connections 39-$i$ of the T/R module. The control unit 91-$i$ is thus arranged to be able to communicate with the control unit 41 in FIG. 3.

To be able to control the directional sensitivity of the antenna unit 25 in FIG. 3 during transmission and reception, as mentioned above, phase-shifting and amplification of the different T/R modules 27-(1-N) are to assume specific values. The control unit 41 therefore sends commands to each T/R module 27-(1-N) about the phase-shifting and amplification to be applied in a given situation. The commanded phase-shifting at transmission and reception, respectively, for T/R module No. 1 27-1($1 \leq 1 \leq N$) is here denoted by $^{T(1)}PHASE_{COM}$ and $^{R(1)}PHASE_{COM}$, respectively.

In a corresponding way $^{T(1)}AMPLIFICATION_{COM}$ and $^{R(1)}AMPLIFICATION_{COM}$, respectively, denote the commanded amplification for T/R module No. 1 27-1 at transmission and reception, respectively. For a simultaneous handling of amplification and phase-shifting it is suitable to use complex units. Thus, commanded complex amplifications $^{T(1)}A_{COM}$ and $^{R(1)}A_{COM}$, respectively, are introduced for T/R module No. 1 27-1 at transmission and reception, respectively, here defined as $$^{T/R(1)}A_{COM} = {}^{T/R(1)}AMPLIFICATION_{COM} \cdot \exp(j \cdot {}^{T/R(1)}PHASE_{COM}) \quad (1)$$

Here j denotes the imaginary unit. The use of complex quantities is only to get a compact notation in the description of the invention and should not in any way be seen as limiting the invention.

Amplification and phase-shifting—the complex amplification—in the T/R module 27-$i$ in FIG. 4 are controlled by means of the controllable attenuator 81-$i$ and the controllable phase shifter 85-$i$. When the T/R module 27-$i$ obtains a certain value of the commanded complex amplification $^{T/R(i)}A_{COM}$ from the control unit 41, it is the task of the control unit 91-$i$ to generate such control signals c3-$i$ and c4-$i$ to the controllable attenuator and the controllable phase shifter that the complex amplification of the T/R module 27-$i$ relative to the other T/R modules corresponds to the actual value of the commanded complex amplification $^{T/R(i)}A_{COM}$.

In order for the control unit of a T/R module like the T/R module 27-$i$ in FIG. 4 to be able to generate control signals to the attenuator and the phase shifter, it is common in the art for the control unit to comprise memory means holding calibration data. The calibration data of the control unit in such a case gives the control unit information about how the control signals to the attenuator and the phase shifter are to be set.

The complex amplification in a T/R module like the T/R module 27-$i$ in FIG. 4 is, however, affected by the temperature and by the carrier frequency currently used by the antenna system. If an antenna system is to control the T/R modules for a number of different values of the commanded complex amplifications $^{T/R(1)}A_{COM}(1 \leq 1 \leq N)$ and utilize different carrier frequencies at the same time as the antenna system is exposed to temperature changes, a large amount of calibration data is needed in the control unit to enable the exact control of the T/R modules for all the combinations of these variables—commanded complex amplifications $^{T/R(1)}A_{COM}$, carrier frequencies and temperature—that can arise.

As mentioned above, an alternative known in the art for arranging an antenna system so that it can re-calibrate itself during operation when one or more of these variables are changed. In a self-calibrating system the control signals to the controllable attenuators and phase shifters are calibrated when some of these variables are changed.

For a self-calibrating system, too, it can, however, be optimal to store a certain amount of calibration data; the exact amount of calibration data that is optimally to be stored in a self-calibrating antenna system depends on the application. If, for example, the values of the commanded complex amplifications $^{T/R(1)}A_{COM}$ vary considerably faster than the temperature and the carrier frequencies used by the system vary, it may be suitable to store such an amount of calibration data that adjustments of the control signals to the controllable attenuators and phase shifters are associated to possible values of the commanded complex amplifications $^{T/R(1)}A_{COM}$. When the temperature or the carrier frequency is changed, the system adjusts the control signals controlling the controllable attenuators and phase shifters, whereby calibration data is modified. If instead the values of the commanded complex amplifications $^{T/R(1)}A_{COM}$ and carrier frequency vary faster than the temperature, it may be suitable to store calibration data associating adjustments of control signals to the controllable attenuators and the controllable phase shifters to the combinations of possible values of the commanded complex amplifications $^{T/R(1)}A_{COM}$ and possible carrier frequencies. If the temperature varies faster than the values of the commanded complex amplifications $^{T/R(1)}A_{COM}$ and carrier frequency, it may be the optimal solution to carry out an adjustment of the control signals controlling the controllable attenuators and phase shifters every time a variable is changed.

Antenna systems that are self-calibrating during operation are, as mentioned above, usually complicated. The antenna system 23 in FIG. 3 can, however, be calibrated with relatively simple means, which will be described in the following.

The antenna system 23 in FIG. 3 comprises a test antenna 45 having a radiation element 46. Through the test antenna 45, signals may be transmitted or received. The test antenna 45 is arranged near the antenna unit 25, so that the signals transmitted through the test antenna 45 can be received through the antenna unit 25 and so that signals transmitted through the antenna unit 25 can be received through the test antenna 45.

The antenna system 23 in FIG. 3 also comprises a signal generator 47. The signal generator 47 comprises a controllable oscillator 49 and a signal switch 53. The controllable oscillator 49 is connected to the signal switch 53. The signal switch 53 can be set to a first and a second position 55 and 57. When the signal switch 53 is in its first position 55, a signal is switched from the controllable oscillator 49 through the signal switch 53 to a first distribution point 59. The first distribution point 59 is connected both to the test antenna 45 and to a first signal input 63 in a receiver 61. When the signal switch 53 is in its second position 57, a signal is switched from the controllable oscillator 49 through the signal switch 53 to a second distribution point 65. The second distribution point 65 is connected both to the analogue distribution connection 33 in the distribution unit 31, and to a second signal input 67 in the receiver 61.

When the signal switch 53 is in its first position 55, thus, a signal from the controllable oscillator 49 will be divided into two parts at the first distribution point 59. One of the signal parts is received by the receiver 61 through the first signal input 63 of the receiver, and the other signal part is fed to the test antenna 45, so that a signal will be transmitted from the test antenna 45. If the signal transmitted from the test antenna 45 in this way is received by the antenna unit 25, the signal received by the antenna unit 25 will be transferred to the second signal input 63 of the receiver 61.

When the signal switch 53 is instead in its second position 57, a signal from the controllable oscillator 49 will be divided into two parts at the second distribution point 65. One signal part is then fed to the second signal input 67 of the receiver, and the other signal part is fed to the analogue distribution connection 33 of the distribution unit 33. A signal can then be transmitted through the antenna unit 25. The signal transmitted through the antenna unit 25 can be received through the test antenna 45, and the signal received through the test antenna is fed to the first signal input 65 of the receiver 61.

The signal generator 47 in FIG. 3 comprises control signal inputs 69 and 71 for receiving control signals c1 and c2 for control of the controllable oscillator 49 and the signal switch 53. The control signal inputs 69 and 71 of the signal generator are connected to a corresponding set of control signal outputs 73 in the control unit 41. The control unit 41 is arranged to emit control signals c1 and c2 through the control signal outputs 73 for control of the signal generator 47. Thus, the control unit can control the position 55 or 57 in which the signal switch 53 will be, and the signal frequencies to be generated by the controllable oscillator 49.

The receiver 61 in FIG. 3 comprises detectors—not shown in FIG. 3—for detection of phase difference and amplitude ratio between the signals received on the first and second signal inputs 63 and 67 of the receiver 61. The receiver 61 also comprises a detector signal output 75 through which a detector signal d1 is emitted. The detector signal d1 distributes information of the phase difference and the amplitude ratio detected by the receiver 61. The detector signal output 75 in the receiver 61 is connected to a corresponding detector signal input 77 in the control unit 41. The control unit 41 thus obtains information about the phase difference and the amplitude ratio detected by the receiver 61.

Each of the T/R modules 27-(1-N) shown in FIGS. 3 and 4 has been arranged with a commandable reference mode at reception. The control unit 41 commands one of the T/R modules, for example, T/R module No. 1 27-1 ($1 \leq 1 \leq N$), in the reference mode at reception by transmitting a command through the digital communication channel to the T/R module 27-1 concerned, said command indicating that the T/R module 27-1 is to be set to its reference mode at reception. The control unit 91-1 in the T/R module 27-1 concerned then sets the T/R module 27-1 in reception mode with predetermined values of the control signals c3-1 and c4-1 for control of the controllable attenuator 81-1 and the controllable phase shifter 85-1 in the T/R module 27-1. For the predetermined values of the control signals c3-1 and c4-1, the complex amplification at reception for the T/R module 27-1 in question have been surveyed as a function of the temperature T and the frequency f, and the control unit 91-1 of the T/R module 27-1 is arranged with memory means holding data from the survey describing the complex amplification of the T/R module 27-1 for the reference mode at reception as a function of the temperature T and the frequency f. In a corresponding way the complex amplification at reception for the other T/R modules 27-$q$ ($1 \leq q \leq N$; $q \neq 1$) has been surveyed for their reference modes at reception, and corresponding data from these surveys has been arranged in the memory means in their respective control units 91-$q$.

It is suitable to make the survey of the complex amplification of the T/R modules 27-(1-N) for the reference modes at reception under ideal conditions, for example, at production or service of the T/R modules 27-(1-N), when methods known in the art investigating the complex amplification of the T/R modules 27-(1-N) at reception can be used.

The complex amplification at reception for the T/R module No. 1 27-1 ($1 \leq 1 \leq N$) as a function of the frequency f, the temperature T and the commanded complex amplification at reception $^{R(1)}A_{COM}$ for T/R module No. 1 27-1 will in the following be denoted $^{R(1)}A(f,T,^{R(1)}A_{COM})$. In a corresponding way the complex amplification at transmission for T/R module No. 1 27-1 as a function of the frequency f, the temper-ature T and the commanded complex amplification at transmission $^{T(1)}A_{COM}$ for T/R module No. 1 27-1 will be denoted $^{T(1)}A(f,T,^{T(1)}A_{COM})$. The complex amplification at reception for the reference mode at reception for T/R module No. 1 27-1 ($1 \leq 1 \leq N$) as a function of the frequency f and the temperature T will in the following be denoted $^{R(1)REF}A(f,T,)$ and is here, because of the survey, a known parameter.

By means of the survey of the complex amplifications at reception $^{R(1)REF}A(f,T)$ ($1 \leq 1 \leq N$) for the reference modes at reception for the T/R modules 27-1, the antenna system 23 can be calibrated for reception in a relatively simple manner, which will now be described.

Figure 5:
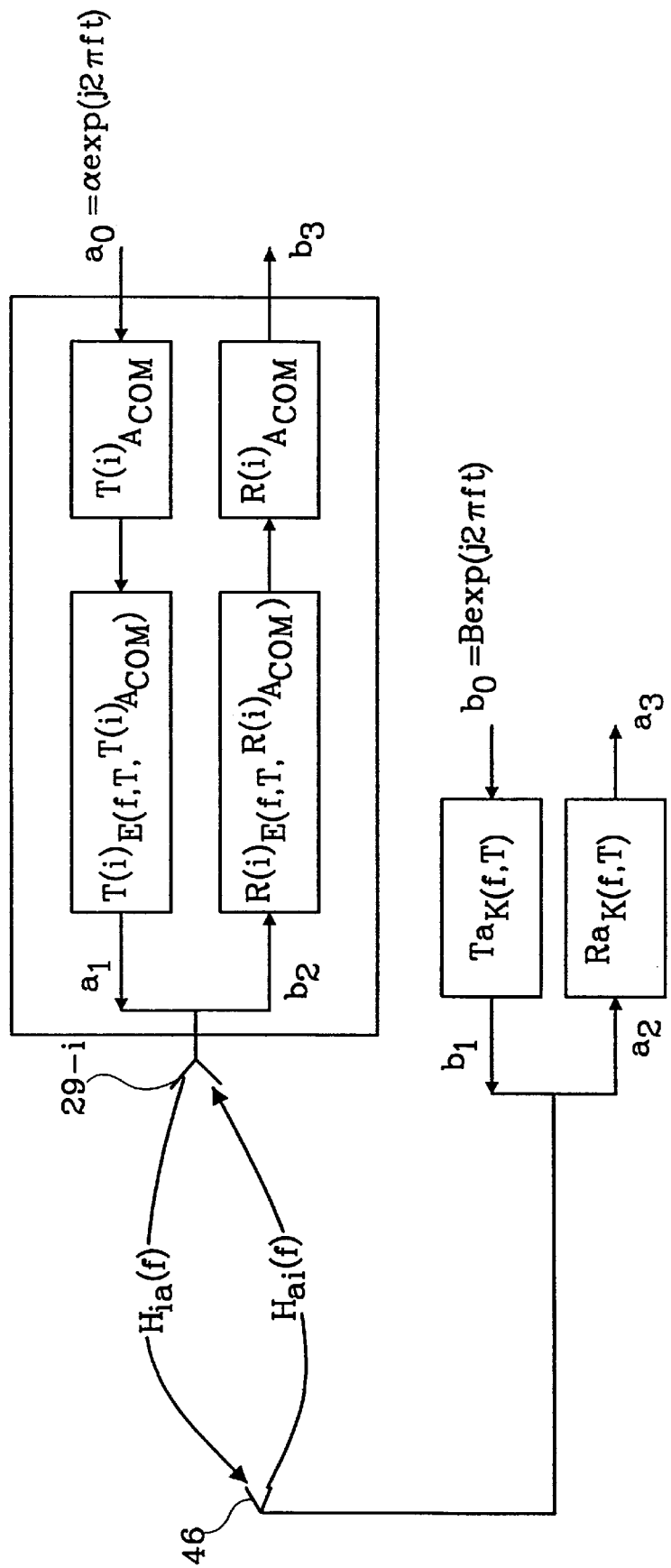
FIG. 5 is a block diagram illustrating signal models.

FIG. 5 shows a signal model used in calibration of the antenna system 23 in FIG. 3 at reception. FIG. 5 describes the signal transport when a test signal, generated by the controllable oscillator 49, is transmitted through the test antenna 45, to be received through the antenna unit 25 of the receiver 61. One of the T/R modules, for example, T/R module No. i 27-$i$, is active at reception, the other T/R modules 27-$q$ ($1 \leq q \leq N$; $q \neq i$) are commanded to their isolated modes. In FIG. 5, a complex description is used, and it is understood that the real signals are obtained by taking the real part of the complex signals in FIG. 5. The test signal $b_0$ from the controllable oscillator 49 is here a harmonically oscillating signal with a frequency f and can thus be written $b_0 = B \exp(j2\pi f\, t)$, where B is a constant, j is the imaginary unit and t is the time.

The signal in FIG. 5 feeding the radiation element 46 of the test antenna 45 is denoted $b_1$ and this signal generally has a different amplitude and phase than the test signal $b_0$. The reasons why the signal driving the radiation element 46 of the test antenna 45 has a different amplitude and phase than the test signal $b_0$ are i.a. signal influence at the transfer of the test signal $b_0$ to the test antenna 45 and signal influence from the transmission circuitry in the test antenna 45. The signal $b_1$ driving the radiation element 46 of the test antenna 45 can be obtained by a first complex amplification $^{Ta}K(f,T)$ of the test signal $b_0$, so that $b_1 = ^{Ta}K(f,T)b_0$. The first complex amplification $^{Ta}K(f,T)$ is here an unknown parameter which may depend on the frequency f of the test signal and of the temperature T.

The radiation element 46 of the test antenna 45 now emits electromagnetic waves, which generate a signal $b_2$ in the radiation element 29-$i$ of T/R module No. i. The signal $b_2$ generated in the radiation element 29-$i$ of T/R module No. i 27-$i$ generally has a different phase and amplitude from the signal $b_1$ driving the radiation element 46 of the test antenna 45. The signal $b_2$ can be obtained by a second complex amplification $H_{ai}(f)$ of the signal $b_1$ so that $b_2 = H_{ai}(f)b_1$. The second complex amplification $H_{ai}(f)$ depends on the frequency f and the way in which the wave propagation between the radiation element 46 of the test antenna 45 and the radiation element 29-$i$ of T/R module No. i 27-$i$ takes place. If the wave propagation between the radiation element 46 of the test antenna 45 and the radiation element 29-$i$ of T/R module No. i 27-$i$ comprises reflections, it is difficult to calculate the second complex amplification $H_{ai}(f)$. Since it is to be possible to calibrate the antenna system 23 in FIG. 3 during operation, when reflections are quite likely to occur, the second complex amplification $H_{ai}(f)$ is here seen as an unknown parameter.

For wave propagation between the radiation element 46 of the test antenna 45 and he radiation element 29-$q$ of the other T/R modules 27-$q$ in a corresponding way complex amplifications $H_{aq}(f)$ ($1 \leq q \leq N$; $q \neq i$) are defined, corresponding to the second complex amplification $H_{ai}(f)$ in FIG. 5.

The signal received through the antenna unit 25, which is received by the receiver 61 through the second signal input 67 of the receiver, is denoted $b_3$ in FIG. 5. The signal $b_3$ only depends on the signal $b_2$ generated in the radiation element 29-$i$ of T/R module No. i 27-$i$, since the other T/R modules 27-$q$ ($1 \leq q \leq N$; $q \neq i$) are in the isolated mode and therefore do not let any signals through. The signal $b_3$ has a different amplitude and phase than the signal $b_2$ and is obtained by the complex amplification at reception $^{R(i)}A(f,T,^{R(i)}A_{COM})$ for T/R module No. i 27-$i$ operating on the signal $b_2$.

The complex amplification at reception $^{R(i)}A(f,T,^{R(i)}A_{COM})$ for T/R module No. i 27-$i$ in FIG. 5 is divided into two parts, the commanded complex amplification at reception $^{R(i)}A_{COM}$ for T/R module No. i, which is a known variable, and a complex error amplification $^{R(i)}E(f,T,^{R(i)}A_{COM})$ at reception for T/R module No. i 27-$i$. The complex error amplification at reception $^{R(i)}E(f,T,^{R(i)}A_{COM})$ is an unknown parameter which can generally depend on the frequency f of the test signal $b_0$, the temperature T and the value of the commanded complex amplification at reception $^{R(i)}A_{COM}$ for T/R module No. i 27-$i$. Introducing the designations we thus have $^{R(i)}A(f,T,^{R(i)}A_{COM}) = ^{R(i)}E(f,T,^{R(i)}A_{COM})\cdot ^{R(i)}A_{COM}$.

In a corresponding way, complex error amplifications at reception $^{R(q)}E(f,T,^{R(q)}A_{COM})$ ($1 \leq q \leq N$; $q \neq i$) are defined for the other T/R modules 27-$q$ corresponding to the complex error amplification at reception $^{R(i)}E(f,T,^{R(i)}A_{COM})$ for T/R module No. i 27-$i$.

A sufficient condition for the antenna system 23 to be calibrated for reception is, as will be understood by those skilled in the art, that the complex error amplification at reception $^{R(1)}E(f,T,^{R(1)}A_{COM})$ for T/R modules 27-1 ($1 \leq 1 \leq N$) is equal to one.

At calibration of the antenna system 23 at reception, the control signals c3-(1-N) and c4-(1-N) controlling the controllable attenuators 81-(1-N) and the controllable phase shifters 85-(1-N) should be adjusted so that the complex error amplifications $^{R(1)}E(f,T,^{R(1)}A_{COM})$ ($1 \leq 1 \leq N$) at reception for all T/R modules 27-(1-N) are equal to one. For this purpose an error equation will now be deduced, on the basis of which a readjustment of the control signals c3-(1-N) and c4-(1-N) for control of the controllable attenuators 81-(1-N) and the controllable phase shifters 85-(1-N) can be made.

A complex amplification ratio at reception $^{R(i)ME}G(f,T,^{R(i)}AC_{COM})$ for T/R module No. i 27-$i$, corresponding to the frequency f and the commanded complex amplification at reception $^{R(i)}A_{COM}$ for T/R module No. i 27-$i$ is here defined as the ratio between the signal $b_3$ received through the second signal input of the receiver and the test signal $b_0$, so that $$^{R(i)ME}G(f,T,^{R(i)}A_{COM}) = b_3/b_0 \qquad (2).$$

An argument to the complex amplification ratio at reception $^{R(i)ME}G(f,T,^{R(i)}A_{COM})$ corresponds to the phase difference between the signal $b_3$ and the signal $b_0$, and the absolute value of the complex amplification ratio at reception $^{R(i)ME}G/f,T,^{R(i)}A_{COM})$ corresponds to the amplitude ratio between the signal $b_3$ and the signal $b_0$. The complex amplification ratio at reception $^{R(i)ME}G(f,T,^{R(i)}A_{COM})$ is a known parameter, since the phase difference and amplitude ratio between the signals $b_3$ and $b_0$ can be detected by the receiver 61.

Complex amplification ratios at reception $^{R(q)ME}G(f,T,^{R}_{(q)}A_{COM})$ for the other T/R modules 27-$q$ ($1 \leq q \leq N$; q$\neq$i) are defined in a corresponding way as for T/R module No. i 27-$i$.

Considering FIG. 5, it is clear that the complex amplification ratio at reception $^{R(i)ME}G(f,T,^{R(i)}A_{COM})$ for T/R module No. i 27-$i$ is combined of the added complex amplification of the first and the second complex amplification and the complex amplification at reception for T/R module No. i 27-$i$ $^{Ta}K(f,T)$, $H_{ai}(f)$ and $^{R(i)}E(f,T,^{R(i)}A_{COM})\cdot^{R(i)}A_{COM}$), so that $$^{R(i)ME}G(f,T,^{R(i)}A_{COM}) = ^{Ta}K(f,T)\cdot H_{ai}(f)\cdot^{R(i)}E(f,T,^{R(i)}A_{COM})\cdot^{R(i)}A_{COM} \qquad (3).$$

Equation (3) is valid independently of the value of the commanded complex amplification at reception $^{R(i)}A_{COM}$; especially a corresponding equation is valid for the reference mode at reception for T/R module No. i, so that $$^{R(i)MEREF}G(f,T) = ^{Ta}K(f,T)\cdot H_{ai}(f)\cdot^{R(i)REF}A(f,T) \qquad (4).$$

Here G denotes $^{R(i)MEREF}G(f,T)$ the complex amplification ratio at reception for the reference mode at reception for the T/R module No. i 27-$i$.

Using Equations (3) and (4) the following error equation is obtained:

$$^{R(i)}E(f, T^{R(i)}, A_{COM}) = \frac{^{R(i)ME}G(f, T^{R(i)}, A_{COM})}{^{R(i)MEREF}G(f, T)} \cdot \frac{^{R(i)REF}A(f, T)}{^{R(i)}A_{COM}}. \qquad (5)$$

The left part of Equation (5) is the complex error amplification at reception for T/R module No. i 27-$i$ $^{R(i)}E(f,T,^{R(i)}A_{COM})$, corresponding to the frequency f and the commanded complex amplification at reception $^{R(i)}A_{COM}$ for T/R module No. i 27-$i$.

The right part of Equation (5) comprises only known parameters, and therefore the complex error amplification at reception $^{R(i)}E(f,T,^{R(i)}A_{COM})$ for T/R module No. i 27-$i$ may be calculated using Equation (5).

Error equations corresponding to the one in Equation (5) are of course valid for the other T/R modules 27-$q$ ($1 \leq q \leq N$; q$\neq$i).

When the complex error amplification at reception $^{R(i)}E(f,T,^{R(i)}A_{COM})$ for T/R module No. i 27-$i$ has been calculated for a certain value of the commanded complex amplification at reception $^{R(i)}A_{COM}$, the control signals c3-$i$ and c4-$i$, controlling the controllable attenuator 81-$i$ and the controllable phase shifter 85-$i$, can be reset in dependence of the calculated complex error amplification at reception $^{R(i)}E(f,T,^{R(i)}A_{COM})$ for T/R module No. i 27-$i$. These control signals c3-$i$ and c4-$i$ are then reset in such a way that the amplification of the T/R module 27-$i$ is changed by a factor corresponding to one divided by the absolute value of the complex error amplification at reception $|^{R(i)}E(f,T,^{R(i)}A_{COM})|$ and so that the phase shift of the T/R module 27-$i$ is reduced corresponding to an argument to the complex error amplification at reception $\arg\{^{R(i)}E(f,T,^{R(i)}A_{COM})\}$.

In the description the concept "calculate" has been used, e.g. in the context of "the calculated complex error amplification". This calculation takes place in a computer in the control unit 41. The computer in this case generates real physical signals representing numerical parameters. It is of course on the basis of this real physical signals that, for example, the readjustment of the control signals c3-(1-N) and c4-(1-N) is made in the antenna system 23.

Figure 6:
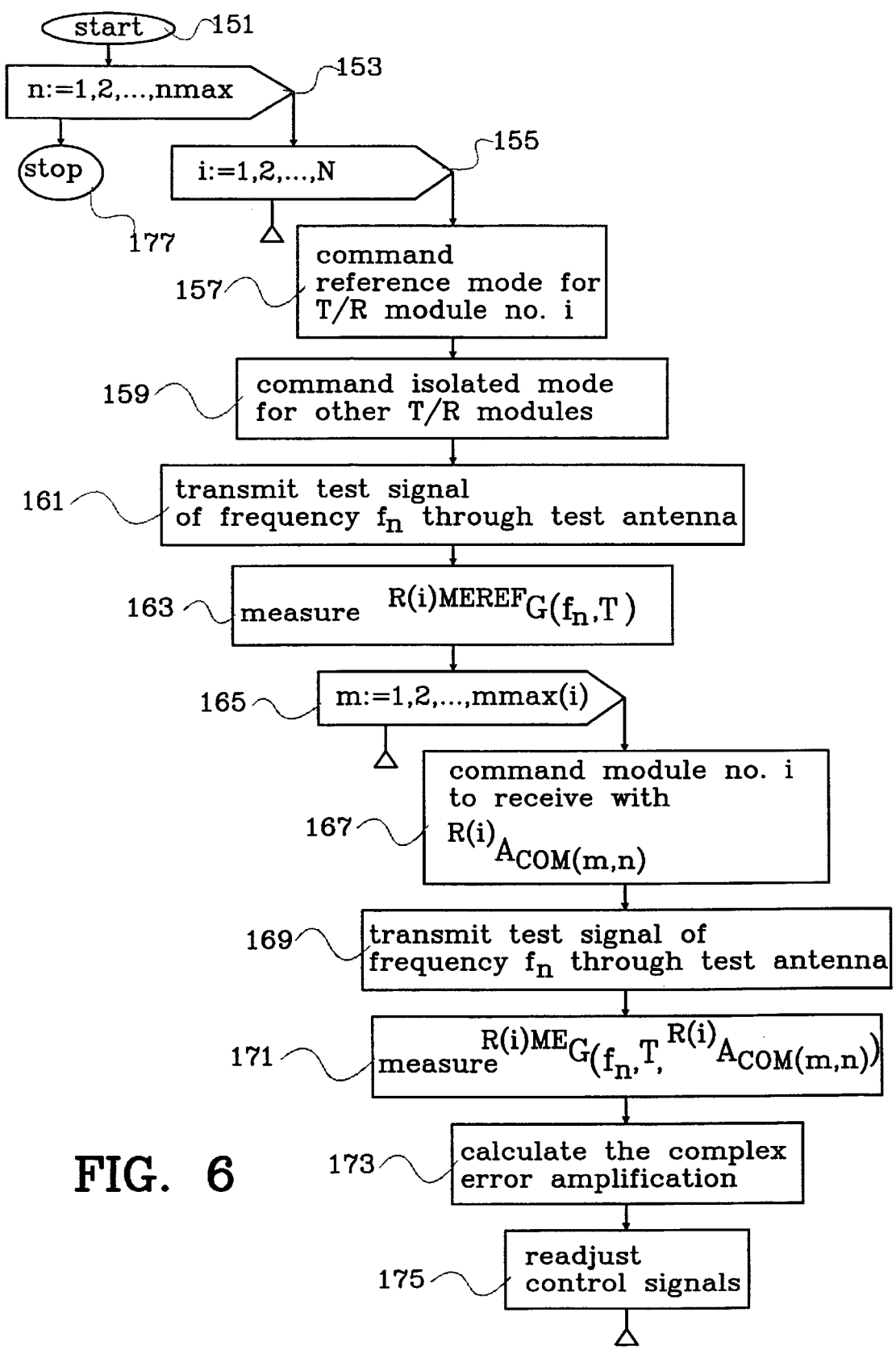
FIG. 6 is a flow chart of calibration of an antenna system during reception.

FIG. 6 shows a flowchart describing an example of how calibration at reception of the antenna system 23 in FIG. 3 is carried out according to the invention. FIG. 6 is meant to exemplify such an application of the antenna system 23 in FIG. 3 in which the values of the commanded complex amplifications at reception $^{R(1)}A_{COM}$ ($1 \leq 1 \leq N$) and the carrier frequencies used by the antenna system 23 vary considerably faster than the temperature T. The control units 91-(1-N) therefore comprise memory means holding calibration data associating settings of the control signals c3-(1-N) and c4-(1-N) for control of the controllable attenuators 81-(1-N) and the controllable phase shifters 85-(1-N) to combinations of values of the commanded complex amplifications at reception $^{R(1)}A_{COM}$($1 \leq 1 \leq N$) occurring for the application concerned, and the carrier frequencies used by the antenna system 23. When the temperature is changed, a readjustment of the control signals c3-(1-N) and c4-(1-N) controlling the controllable 81-(1-N) and the controllable phase shifters 85-(1-N), takes place, whereby calibration data in the control units 91-(1-N) is modified.

In FIG. 6 the calibration of the antenna system 23 is first carried out for a first carrier frequency $f_1$. This is then repeated for a predetermined number of other carrier frequencies $f_2$-$f_{nmax}$.

For each carrier frequency $f_1$-$f_{nmax}$ the calibration in FIG. 6 is first carried out for T/R module No. 1 27-1, and the process is then repeated for the other T/R modules 27-(2-N). This repetition is indicated in FIG. 6 by a block 155.

For an arbitrary module, for example, the T/R module No. i, the calibration process in FIG. 6 for an arbitrary carrier frequency, for example, carrier frequency No. n, $f_n$, implies the following:

T/R module No. i 27-i is commanded to its reference mode, as indicated in FIG. 6 by a block 157. The control unit 91-i of T/R module No. i 27-i at this point receives information about the carrier frequency $f_n$ from the control unit 41 and about the temperature T from the thermometer 141-i. Since the complex amplification at reception $^{R(i)REF}A(f,T)$ for the reference mode at reception has been surveyed as a function of the frequency f and temperature T, the complex amplification at reception $^{R(i)REF}A(f,T)$ for the reference mode at reception is thereby, as mentioned above, a known parameter.

The other T/R modules 27-q ($1 \leq 1 \leq N$; $q \neq i$) are commanded, as indicated in FIG. 6 by a block 159, by the control unit 41 to their isolated modes, whereby the third switch 125-q of these T/R modules 27-q are set to its second position 131-q.

The control unit 41 controls the signal generator 47 in such a way that the signal switch 53 is set to its first position 55 and so that the oscillator 49 generates a harmonically oscillating first test signal of the frequency $f_n$. The first test signal will then be transmitted through the test antenna 45, as indicated in FIG. 6 by a block 161. The first test signal transmitted through the test antenna 45 is now received through the antenna unit 25, and the receiver 61 thus receives a first received signal through its second signal input 67, said signal corresponding to the reference mode at reception for T/R module No. i 27-i and the first test signal. The receiver 61 also receives the first test signal through its first signal input 63. A first complex amplification ratio at reception $^{R(i)MEREF}G(f_n,T)$ for T/R module No. i 27-i, corresponding to the reference mode at reception for T/R module No. i 27-i and the carrier frequency $f_n$ is measured by detection in the receiver 61 of the phase difference and the amplitude ratio between the first received signal and the first test signal. The measurement of the first complex amplification ratio at reception $^{R(i)MEREF}G(f_n,T)$ for T/R module No. i 27-i is indicated in FIG. 6 by a block 163.

The calibration in FIG. 6 of T/R module No. i 27-i for the carrier frequency $f_n$ is first carried out for a first value of the commanded complex amplification at reception $^{R(i)}A_{COM(1,n)}$ for T/R module No. i 27-i. The calibration process for T/R module No. i 27-i for the carrier frequency $f_n$ is then carried out for a predetermined number of additionally values on the commanded complex amplification at reception $^{R(i)}A_{COM(2,n)}$–$^{R(i)}A_{COM(nmax(i),n)}$ for T/R module No. i 27-i. This repetition is indicated in FIG. 6 by a block 165.

For an arbitrary one of these values, for example, value No. m, of the commanded complex amplification at reception $^{R(i)}A_{COM(m,n)}$ for T/R module No. i 27-i the calibration is carried out for T/R module No. i and carrier frequency $f_n$ according to the following.

T/R module No. i 27-i is commanded, as indicated in FIG. 6 by a block 167, to reception with value No. m of the commanded complex amplification at reception $^{R(i)}A_{COM(m,n)}$ for T/R module No. i 27-i. The control unit 91-i in T/R module No. i 27-i controls the first and the second controllable switch 99-i and 113-i so that they assume their second positions 107-i and 121-i and the third controllable switch 125-i so that it assumes its first position 129-i. The control unit 91-i in T/R module No. i 27-i obtains information about the carrier frequency $f_n$ and value No. m of the commanded complex amplification at reception $^{R(i)}$ $A_{COM(m,n)}$ for T/R module No. i 27-i from the control unit 41. The control unit 91-i adjusts, based on calibration data, the control signals c3-i and c4-i to the controllable attenuator 81-i and the controllable phase shifter 85-i of T/R module No. i 27-i. The other T/R modules 27-q (123 $q \leq N$; $q \neq i$) remain commanded to their isolated modes.

The control unit 41 makes sure that the signal switch of the signal generator 47 is in its first position 55 and that the oscillator 49 generates a harmonically oscillating second test signal having the frequency $f_n$. The second test signal is thus emitted through the test antenna 45, as indicated in FIG. 6 by a block 169. The second test signal, emitted through the test antenna 45 is received through the antenna unit 25, and the receiver 61 thus receives, through its second signal input 67, a second received signal, corresponding to value No. m of the commanded complex amplification at reception $^{R(i)}$ $A_{COM(m,n)}$ for T/R module No. i 27-i and the second test signal. The receiver 61 receives the second test signal through its first signal input 63. A second complex amplification ratio at reception $^{R(i)ME}G(f_n,T,^{R(i)}A_{COM(m,n)})$ for T/R module No. i 27-i, corresponding to value No. m of the commanded complex amplification at reception $^{R(i)}A_{COM(m,n)}$ for T/R module No. i 27-i and the frequency $f_n$, is measured in the receiver 61 by detection of the phase difference and amplitude ratio between the second received signal and the second test signal. The measurement of the second complex amplification ratio at reception $^{R(i)ME}G(f_n,T,^{R(i)}A_{COM(m,n)})$ for T/R module No. i 27-i is indicated in FIG. 6 by a block 171.

The calibration of T/R module No. i 27-i for value No. m of the commanded complex amplification at reception $^{R(i)}$ $A_{COM(m,n)}$ and the frequency $f_n$ continues, as indicated in FIG. 6 by a block 173, by the calculation of the complex error amplification at reception $^{R(i)}E(f_n,T,^{R(i)}A_{COM(m,n)})$ for T/R module No. i 27-i, corresponding to the carrier frequency $f_n$ and value No. m of the commanded complex amplification at reception $^{R(i)}A_{COM(m,n)}$ for T/R module No. i 27-i, in dependence of the first complex amplification ratio at reception $^{R(i)MEREF}G(f_n,T)$ for T/R module No. i 27-i and the second complex amplification ratio at reception $^{R(i)ME}G(f_n,T,^{R(i)}A_{COM(m,n)})$ for T/R module No. i 27-i. When calculating the complex error amplification at reception $^{R(i)}E(f_n,T,^{R(i)}A_{COM(m,n)})$ for T/R module No. i 27-i, Equation (5) is used.

In dependence of the calculated complex error amplification at reception $^{R(i)}E(f_n,T,^{R(i)}A_{COM(m,n)})$ for T/R module No. i 27-i, a readjustment of the control signals c3-i and c4-i controlling the controllable attenuator 81-i and the controllable phase shifter 85-i is made in T/R module No. i 27-i as indicated in FIG. 6 by a block 175. The control signals c3-i and c4-i are, as mentioned above, to be readjusted in such a way that the amplification in T/R module No. i is changed by a factor corresponding to one divided by the absolute value of the calculated complex error amplification at reception for T/R module No. i $|^{R(i)}E(f_n,T,^{R(i)}A_{COM(m,n)})|$ and in such a way that the phase shift is reduced corresponding to an argument to the calculated complex error amplification at reception for T/R module No. i 27-i arg$\{^{R(i)}E(f_n,T,^{R(i)}A_{COM(m,n)})\}$. The control unit 91-i in T/R module i 27-i at this stage obtains information about the calculated complex error amplification at reception $^{R(i)}E(f_n,T^{R(i)}A_{COM(m,n)})$ for T/R module No. i 27-i from the control unit 41. The control unit 91-i is arranged to calculate, on the basis of the current setting of the control signals c3-i and c4-i, and in dependence of the complex error amplification at reception $^{R(i)}E(f_n,T,^{R(i)}A_{COM(m,n)})$ for T/R module No. i 27-i, how the control signals c3-i and c4-i are to be readjusted to achieve the desired result, and calibration data in the control unit 91-$i$ in T/R module No. $i$ 27-$i$ is modified in accordance with this.

In practice, a controllable oscillator, such as the controllable oscillator 49 in FIG. 3, does not generate a perfect harmonically oscillating signal. Instead it generates a narrowband signal having a bandwidth different from zero. The calibration process described above, as will be understood by the skilled person, also functions for such narrowband signals.

The invention is, however, not limited to the use of narrowband test signals. If a more broadband test signal $\beta_0(t)$ is transmitted through the test antenna 45 instead of the test signal $b_0$ in FIG. 5, this broadband test signal $\beta_0(t)$ can be used in the calibration. Instead of the signal $b_3$ in FIG. 5, the receiver 61 then receives a received signal $\beta_3(t)$. Let $\vec{\beta}_0(f)$ and $\vec{\beta}_3(f)$, respectively denote the Fourier transforms of $\beta_0(t)$ and $\beta_3(t)$, respectively. The complex amplification ratio at reception $^{R(i)ME}G(f,T,{}^{R(i)}A_{COM})$ for T/R module No. $i$ can then, as will be understood by the person skilled in the art, be obtained as the ratio between the two Fourier transforms $\vec{\beta}_0(f)$ and $\vec{\beta}_3(f)$, so that $$^{R(i)ME}G(f,T,{}^{R(i)}A_{COM}) = \vec{\beta}_3(f)/\vec{\beta}_0(f) \qquad (6).$$

If the broadband test signal $\beta_0(t)$ comprises one or more of the carrier frequencies used by the antenna system 23, the complex amplification ratio at reception $^{R(i)ME}G(f,T,{}^{R(i)}A_{COM})$ for T/R module No. $i$ can then be calculated for these carrier frequencies using Equation (6), to be used later in the calibration at reception of the antenna system 23. To be able to calibrate the antenna system 23 in FIG. 2 using broadband test signals, of course the signal generator 49 and the receiver 61 must be modified so that broadband test signals can be generated and so that Fourier transforms can be carried out. In all other respects the calibration at reception can be carried out as described above.

Thus, a first way of calibration of the antenna system 23 at reception has been described. In the following calibration of the antenna system 23 at transmission, and another method for calibration at reception, will be described.

FIG. 5 also shows a signal model that may be used at calibration of the antenna system 23 in FIG. 3 at transmission. FIG. 5 describes the signal transport when a test signal $a_0$, generated by the controllable oscillator 49, is transmitted through the antenna unit 25 to be received by the test antenna 45 of the receiver 61. One of the T/R modules, for example, T/R module No. $i$ 27-$i$ is active when transmitting. The other T/R modules 27-$q$ ($1 \leq q \leq N$; $q \neq i$) are commanded to their isolated modes. In FIG. 5, as before, a complex description is used, and it is understood, as before, that the real signals are obtained by taking the real part of the complex signals in FIG. 5. The test signal $a_0$ from the controllable oscillator 49 in this case is a harmonic oscillating signal having a frequency $f$ and can thus be written as $a_0 = \alpha \exp(j2\pi f t)$, $\alpha$ being a constant.

The signal feeding the radiation element 29-$i$ in T/R module $i$ 27-$i$ in FIG. 5 is denoted $a_1$ and this signal generally has an amplitude and a phase different from the test signal $a_0$. The signal $a_1$ is obtained by the complex amplification at transmission $^{T(i)}\Lambda(f,T,{}^{T(i)}A_{COM})$ in T/R module No. $i$ 27-$i$ operating on the signal $a_0$.

The complex amplification at transmission $^{T(i)}\Lambda(f,T,{}^{T(i)}A_{COM})$ for T/R module No. $i$ 27-$i$ in FIG. 5 is divided into two parts: the commanded complex amplification at transmission $^{T(i)}A_{COM}$ for T/R module No. $i$ 27-$i$, which is a known variable, and a complex error amplification at transmission $^{T(i)}E(f,T,{}^{T(i)}A_{COM})$ for T/R module No. $i$ 27-$i$. The complex error amplification at transmission $^{T(i)}E(f,T,{}^{T(i)}A_{COM})$ for T/R module No. $i$ 27-$i$ is an unknown variable, generally depending on the frequency $f$, the temperature $T$ and the value of the commanded complex amplification at transmission $^{T(i)}A_{COM}$ for T/R module No. $i$ 27-$i$. Introducing the representation we thus have $^{T(i)}\Lambda(f,T\;{}^{T(i)}A_{COM}) = {}^{T(i)}E(f,T,{}^{T(i)}A_{COM}) \cdot {}^{T(i)}A_{COM}$.

In a corresponding way complex error amplifications at transmission $^{T(q)}E(f,T,{}^{T(q)}A_{COM})$ ($1 \leq q \leq N$; $q \neq i$) are defined for the other T/R modules 27-$q$ corresponding to the complex error amplification at transmission $^{T(i)}E(f,T,{}^{T(i)}A_{COM})$ for T/R module No. $i$ 27-$i$.

The radiation element 29-$i$ in T/R module No. $i$ 27-$i$ now emits electromagnetic waves generating a signal $a_2$ in the radiation element 46 of the test antenna 45. The signal $a_2$ generated in the radiation element 46 of the test antenna 45 in general has a different phase and amplitude from the signal $a_1$ driving the radiation element 29-$i$ in T/R module No. $i$ 27-$i$. The signal $a_2$ may be obtained through a third complex amplification $H_{ia}(f)$ of the signal $a_1$ so that $a_2 = H_{ia}(f)a_1$. The third complex amplification $H_{ia}(f)$ depends on the frequency $f$ and the way in which the wave propagation between the radiation element 29-$i$ in T/R module No. $i$ 27-$i$ and the radiation element 46 of the test antenna 45 takes place. If the wave propagation between the radiation element 29-$i$ of T/R module No. $i$ 27-$i$ and the radiation element 46 of the test antenna 45 implies reflections, it is difficult to calculate the third complex amplification $H_{ia}(f)$. Since it is to be possible to calibrate the antenna system 23 in FIG. 3 during operation, when reflections are quite likely to occur, the third complex amplification $H_{ia}(f)$ is here seen as an unknown variable.

The signal now received by the receiver 61 through its first signal input 63 is denoted as $a_3$ in FIG. 5. The signal $a_3$ generally has a different amplitude and phase from the signal $a_2$ generated in the radiation element 46 of the test antenna 45.

The reasons for this are, among other things, signal influence from the receiver circuitry in the test antenna 45 and signal influence at the signal transfer from the test antenna 45 to the first signal input 63 of the receiver 61. The signal $a_3$ may be obtained through a fourth complex amplification $^{Ra}K(f,T)$ of the signal $a_2$, so that $a_3 = {}^{Ra}K(f,T)a_2$. The fourth complex amplification $^{Ra}K(f,T)$ is here an unknown variable, which may depend on the frequency $f$ and the temperature $T$.

A complex amplification ratio at transmission $^{T(i)ME}G(f,T,{}^{T(i)}A_{COM})$ for T/R module No. $i$ 27-$i$, corresponding to the frequency $f$ and the commanded complex amplification at transmission $^{T(i)}A_{COM}$, is here defined as the ratio between the signal $a_3$ received through the first signal input 63 of the receiver 61 and the test signal $a_0$, so that $$^{T(i)ME}G(f,T,{}^{T(i)}A_{COM}) = a_3/a_0 \qquad (7).$$

An argument to the complex amplification ratio at transmission $^{T(i)ME}G(f,T,{}^{T(i)}A_{COM})$ for T/R module No. $i$ 27-$i$ corresponds to the phase difference between the signal $a_3$ and the signal $a_0$, and the value of the complex amplification ratio at transmission $^{T(i)ME}G(f,T,{}^{T(i)}A_{COM})$ for T/R module No. $i$ 27-$i$ corresponds to the amplitude ratio between the signal $a_3$ and the signal $a_0$. The complex amplification ratio at transmission $^{T(i)ME}G(f,T,{}^{T(i)}A_{COM})$ for T/R module No. $i$ 27-$i$ is a known variable, since the phase difference and the amplitude ratio between the signals $a_3$ and $a_0$ may be detected by the receiver 61.

Complex amplification ratios at transmission eq20 for the other T/R modules 27-$q$ ($1 \leq 1 \leq N$; $q \neq i$) are defined in a corresponding way as for T/R module No. i 27-$i$.

Considering FIG. 5 it is seen that the complex amplification ratio at transmission $^{T(i)ME}G(f,T,^{T(i)}A_{COM})$ for T/R module No. i 27-$i$ is the added complex amplification of the complex amplification at transmission in T/R module No. i 27-$i$, the third complex amplification and the fourth complex amplification $^{T(i)}A(f,T,^{T(i)}A_{COM})$, $H_{ia}(f)$ and $^{Ra}K(f,T)$. We therefore have:

$$^{T(i)ME}G(f,T,^{T(i)}A_{COM})=H_{ia}(f) \cdot {}^{Ra}K(f,T) \cdot {}^{T(i)}E(f,T,^{T(i)}A_{COM}) \cdot {}^{T(i)}A_{COM} \quad (8).$$

According to the present invention two ways of calibrating the antenna system 23 at transmission will now be suggested. According to the first method the calibration at transmission is carried out in a corresponding way as at reception. According to the second method the reference modes at reception are utilized for calibration in transmission as well.

In the following the first method of calibration at transmission is described. Since this first method of calibrating the antenna system 23 corresponds exactly to the way in which the antenna system 23 was calibrated at reception, which was described in detail above, this will be described relatively briefly.

The T/R modules 27-(1-N) have at this stage been arranged with commandable reference modes at transmission. The control unit 41 commands one of the T/R modules, for example T/R module No. 1 27-1($1 \leq 1 \leq N$), to the reference mode at transmission in a corresponding way to the commanding of T/R module No. 1 to the reference mode at reception, which was described above. The complex amplifications of the T/R modules 27-(1-N)) at transmission have been surveyed as functions of the frequency and the temperature T. The complex amplification at transmission for the reference mode for transmission for T/R module No. 1 27-1 as a function of the frequency f and the temperature T will be denoted in the following as $^{T(i)REF}A(f,T)$ and is a known parameter because of the survey.

The following equation, corresponding to Equation (4) is valid for transmission for the reference mode at transmission for T/R module No. i 27-$i$.

$$^{T(i)MEREF}G(f,T)={}^{Ra}K(f,T) \cdot H_{ia}(f) \cdot {}^{T(i)REF}A(f,T) \quad (9).$$

Here, $^{T(i)MEREF}G(f,T)$ denotes the complex amplification ratio at transmission for the reference mode at transmission for T/R module No. i 27-$i$.

Using the Equations (8) and (9) the following error equation is obtained, corresponding to the error equation for the reception case in Equation (5).

$$^{T(i)}E(f,T^{T(i)},A_{COM}) = \frac{^{T(i)ME}G(f,T^{R(i)},A_{COM})}{^{T(i)MEREF}G(f,T)} \cdot \frac{^{T(i)REF}A(f,T)}{^{T(i)}A_{COM}} \quad (10)$$

The right part of Equation (10) only comprises known parameters. The complex error amplification at transmission $^{T(i)}E(f,T,^{T(i)}A_{COM})$ is calculated using Equation (10).

Error equations corresponding to the one in Equation (10) are of course valid for the other T/R modules 27-$q$ ($1 \leq q \leq N$; $q \neq i$).

When the complex error amplification at transmission $^{T(i)}E(f,T,^{T(i)}A_{COM})$ for T/R module No. i 27-$i$ has been calculated for a certain value of the commanded complex amplification at transmission $^{T(i)}A_{COM}$ for T/R module No. i 27-$i$, the control signals c3-$i$ and c4-$i$ controlling the controllable attenuator 81-$i$ and the controllable phase shifter 85-$i$ can be readjusted in dependence of the calculated complex error amplification at transmission $^{T(i)}E(f,T,^{T(i)}A_{COM})$ for T/R module No. i 27-$i$. These control signals c3-$i$ and c4-$i$ are to be readjusted at this stage so that the amplification of T/R module No. i 27-$i$ is changed by a factor corresponding to one divided by the value of the complex error amplification at transmission $|^{T(i)}E(f,T,^{T(i)}A_{COM})|$ for T/R module No. i 27-$i$ and in such a way that the phase shift of the T/R module 27-$i$ is reduced corresponding to an argument of the complex error amplification at transmission $\arg\{^{T(i)}E(f,T,^{T(i)}A_{COM})\}$ for T/R module No. i 27-$i$.

The calibration of the antenna system 23 at transmission according to the first method, as stated above, corresponds to the calibration at reception as described above. The detailed description of the calibration at reception, illustrated in FIG. 6, can therefore also be said to illustrate the calibration at transmission according to the first method. This is of course only true if FIG. 6 is modified in an appropriate way. For example, for calibration at transmission according to the first method of calibration at transmission, the test signals are transmitted through the antenna unit 25 and received through the test antenna 45, while the opposite was true for calibration at reception.

The other method of calibrating the antenna system 23 at transmission will be described in the following. According to this other method the reference modes at reception are also used for calibration as transmission.

One of the T/R modules, for example T/R module No. r27-$r$ is selected at this stage as a reference module 27-$r$. An equation corresponding to Equation (8) is valid for the reference module 27-$r$, so that $$^{T(r)ME}G(f,T,^{T(r)}A_{COM})=H_{ra}(f) \cdot {}^{Ra}K(f,T) \cdot {}^{T(r)}E(f,T,^{T(r)}A_{COM}) \cdot {}^{T(r)}A_{COM} \quad (11).$$

A value of the commanded complex amplification at transmission $^{T(r)}A_{COM(0)}$ for the reference module is selected as a value for comparison at transmission $^{T(r)}A_{COM(0)}$. From Equation (11) is obtained, for the value for comparison at transmission $^{T(r)}A_{COM(0)}$:

$$^{T(r)ME}G(f,T,^{T(r)}A_{COM(0)})=H_{ra}(f) \cdot {}^{Ra}K(f,T) \cdot {}^{T(r)}E(f,T,^{T(r)}A_{COM(0)}) \cdot {}^{T(r)}A_{COM(0)} \quad (12).$$

Using Equations (11) and (12) gives $$\frac{^{T(r)}E(f,T^{T(r)},A_{COM})}{^{T(r)}E(f,T^{T(r)},A_{COM(0)})} = \frac{^{T(r)ME}G(f,T^{T(r)},A_{COM})}{^{T(r)ME}G(f,T^{T(r)},A_{COM(0)})} \cdot \frac{^{T(r)}A_{COM(0)}}{^{T(r)}A_{COM}} \quad (13).$$

The left part of Equation (13) is a complex error ratio at transmission $$\frac{^{T(r)}E(f,T^{T(r)},A_{COM})}{^{T(r)}E(f,T^{T(r)},A_{COM(0)})}$$

for the reference module 27-$r$, corresponding to the frequency f, the commanded complex amplification at transmission $^{T(r)}A_{COM}$ for the reference module 27-$r$ and the value for comparison at transmission $^{T(r)}A_{COM(0)}$. The right part of Equation (13) comprises only known parameters. The complex error ratio at transmission $$\frac{T^{(r)}E(f, T^{T(r)}, A_{COM})}{T^{(r)}E(f, T^{T(r)}, A_{COM(0)})}$$

for the reference module 27-$r$ can thus be calculated on the basis of Equation (13).

The antenna system 23 is, as will be understood by a person skilled in the art, calibrated at transmission if the complex error amplifications at transmission $T^{(1)}E(f,T,^{T(1)}A_{COM})$ ($1 \leq 1 \leq N$) are the same for all T/R modules 27-(1-N). Using the other method of calibration at transmission it is the intention that all T/R modules 27-(1-N) are to have the same complex error amplification at transmission $T^{(1)}E(f,T,^{T(1)}A_{COM})$ as the error amplification of the reference module 27-$r$ at transmission $T^{(r)}E(f,T,^{T(r)}A_{COM(0)})$, corresponding to the value for comparison at transmission $T^{(r)}A_{COM(0)}$. A necessary condition for this to be fulfilled is that the complex error ratio at transmission $$\frac{T^{(r)}E(f, T^{T(r)}, A_{COM})}{T^{(r)}E(f, T^{T(r)}, A_{COM(0)})}$$

for the reference module 27-$r$, corresponding to the frequency f, the commanded complex amplification at transmission $T^{(r)}A_{COM}$ for the reference module 27-$r$ and the value for comparison at transmission $T^{(r)}A_{COM(0)}$, is equal to one. When the complex error ratio at transmission $$\frac{T^{(r)}E(f, T^{T(r)}, A_{COM})}{T^{(r)}E(f, T^{T(r)}, A_{COM(0)})}$$

for the reference module 27-$r$ has been calculated for a value of the commanded complex amplification at transmission $T^{(r)}A_{COM}$ for the reference module 27-$r$, the control signals c3-$r$ and c4-$r$ controlling the controllable attenuator 81-$r$ and the controllable phase shifter 85-$r$ in the reference module 27-$r$ may be readjusted in dependence of the calculated complex error ratio at transmission $$\frac{T^{(r)}E(f, T^{T(r)}, A_{COM})}{T^{(r)}E(f, T^{T(r)}, A_{COM(0)})}$$

for the reference module 27-$r$. The control signals c3-$r$ and c4-$r$ are to be readjusted at this stage so that the amplification of the reference module 27-$r$ is changed by a factor corresponding to one divided by the absolute value of the complex error ratio at transmission $$\left| \frac{T^{(r)}E(f, T^{T(r)}, A_{COM})}{T^{(r)}E(f, T^{T(r)}, A_{COM(0)})} \right|$$

and so that the phase shift of the reference module 27-$r$ is reduced corresponding to an argument to the complex error ratio at transmission $$\arg\left\{ \frac{T^{(r)}E(f, T^{T(r)}, A_{COM})}{T^{(r)}E(f, T^{T(r)}, A_{COM(0)})} \right\}.$$

For the other T/R modules 27-$q$ ($1 \leq q \leq N$; $q \neq r$) the control signals c3-$q$ and c4-$q$ to the controllable attenuators 81-$q$ and the controllable phase shifters 85-$q$ are to be adjusted so that the complex error amplifications $T^{(q)}E(f,T,^{T(q)}A_{COM})$ at transmission for these T/R modules 27-$q$ correspond to the complex error amplification at transmission $T^{(r)}E(f,T,^{T(r)}A_{COM(0)})$ for reference module 27-$r$, corresponding to the value for comparison at transmission $T^{(r)}A_{COM(0)}$. For this purpose an equation will now be deduced, from which this readjustment can be carried out for T/R module No. i 27-$i$.

Using Equations (8) and (12) we first obtain:

$$\frac{T^{(i)}E(f, T^{T(i)}, A_{COM})}{T^{(r)}E(f, T^{T(r)}, A_{COM(0)})} = \frac{T^{(i)ME}G(f, T^{T(i)}, A_{COM})}{T^{(r)ME}G(f, T^{T(r)}, A_{COM(0)})} \cdot \frac{H_{ra}(f)}{H_{ia}(f)} \cdot \frac{T^{(r)}A_{COM(0)}}{T^{(i)}A_{COM}}. \tag{14}$$

The right part of Equation (14) comprises three ratios. The first and the third ratio comprise only known variables. The second ratio, that is $$\frac{H_{ra}(f)}{H_{ia}(f)}$$

is unknown and must therefore be expressed in terms of known parameters to enable the use of Equation (14). It is therefore observed that an equation corresponding to Equation (4) is also valid for the reference module 27-$r$, so that $$^{R(r)MEREF}G(f,T) = {}^{Ta}G(f,T) \cdot H_{ar}(f) \cdot {}^{R(r)REF}\Lambda(f,T) \tag{15}.$$

Using Equations (4) and (15) we obtain:

$$\frac{H_{ra}(f)}{H_{ia}(f)} = \frac{{}^{R(r)MEREF}G(f,T)}{{}^{R(i)MEREF}G(f,T)} \cdot \frac{{}^{R(i)REF}\Lambda(f,T)}{{}^{R(r)REF}\Lambda(f,T)}. \tag{16}$$

A reciprocity well known to those skilled in the art between transmission and reception between antennas makes $H_{ai}(f) = H_{ia}(f)$. In a corresponding way, of course $H_{ar}(f) = H_{ra}(f)$. The left part of Equation (16) is therefore equal to the unknown second ratio $$\frac{H_{ra}(f)}{H_{ia}(f)}$$

of the right part of Equation (14). The right part of Equation (16) comprises only known parameters and can therefore replace the second ratio $$\frac{H_{ra}(f)}{H_{ia}(f)}$$

in Equation (14), so that:

$$\frac{T^{(i)}E(f, T^{T(i)}, A_{COM})}{T^{(r)}E(f, T^{T(r)}, A_{COM(0)})} = \frac{T^{(i)ME}G(f, T^{T(i)}, A_{COM})}{T^{(r)ME}G(f, T^{T(r)}, A_{COM(0)})} \cdot \frac{{}^{R(r)MEREF}G(f,T)}{{}^{R(i)MEREF}G(f,T)} \cdot \frac{{}^{R(i)REF}\Lambda(f,T)}{{}^{R(r)REF}\Lambda(f,T)} \cdot \frac{T^{(r)}A_{COM(0)}}{T^{(i)}A_{COM}}. \tag{17}$$

The left part of Equation (17) is a complex error ratio at transmission $$\frac{^{T(i)}E(f, T^{T(i)}, A_{COM})}{^{T(r)}E(f, T^{T(r)}, A_{COM(0)})}$$

for T/R module No. i 27-$i$, corresponding to the frequency f, the commanded complex amplification at transmission $^{T(i)}A_{COM}$ for T/R module No. i 27-$i$ and the reference value at transmission $^{T(r)}A_{COM(0)}$. The right part of Equation (17) only comprises known parameters and the complex error ratio at transmission $$\frac{^{T(i)}E(f, T^{T(i)}, A_{COM})}{^{T(r)}E(f, T^{T(r)}, A_{COM(0)})}$$

for T/R module No. i 27-$i$ can therefore be calculated from Equation (17). The readjustment of the control signals c3-$i$ and c4-$i$ is carried out in such a way that the amplification in T/R module No. i 27-$i$ is changed by a factor corresponding to one divided by the value of the complex error ratio at transmission $$\left| \frac{^{T(i)}E(f, T^{T(i)}, A_{COM})}{^{T(r)}E(f, T^{T(r)}, A_{COM(0)})} \right|$$

and in such a way that the phase shift is reduced corresponding to an argument to the complex error ratio at transmission $$\arg \left\{ \frac{^{T(i)}E(f, T^{T(i)}, A_{COM})}{^{T(r)}E(f, T^{T(r)}, A_{COM(0)})} \right\}.$$

Considering Equation (17) it is seen that the calibration of the antenna system 23 during transmission according to the second method implies both the transmission and the reception of test signals through the antenna unit 25. The second method of calibration at transmission has the advantage that the reference modes at reception can be used also for the calibration at transmission, which reduces the amount of data that has to be stored in the antenna system 23 to enable calibration.

Equations corresponding to Equation (17) are of course valid for the other T/R modules 27-$q$ ($1 \leq q \leq N$; $q \neq i$, r).

Figure 7:
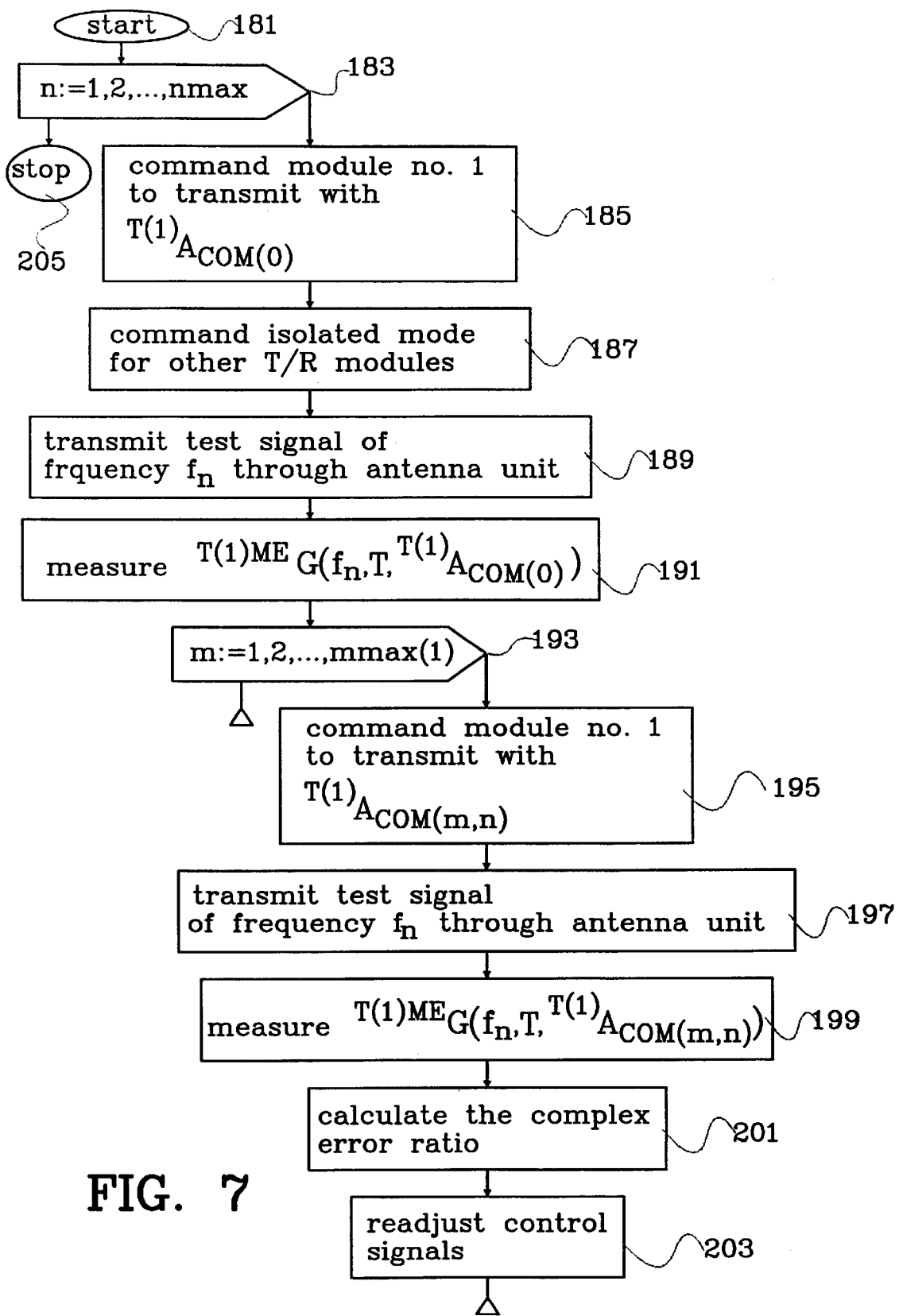
FIG. 7 is a flow chart of a substep at calibration of an antenna system during transmission.
Figure 8:
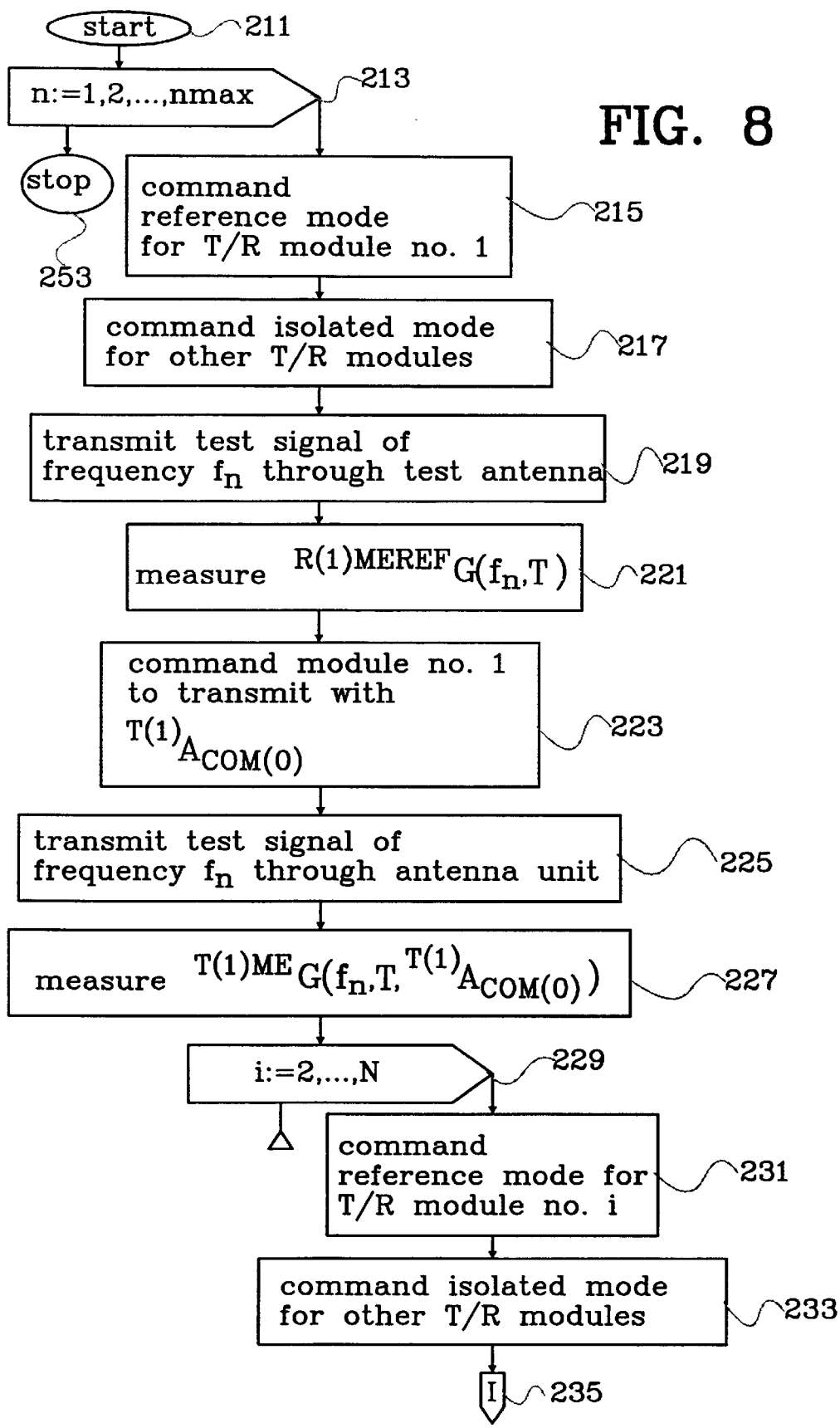
FIG. 8 shows a first part of a flow chart of a sub-step at calibration of an antenna system during transmission.
Figure 9:
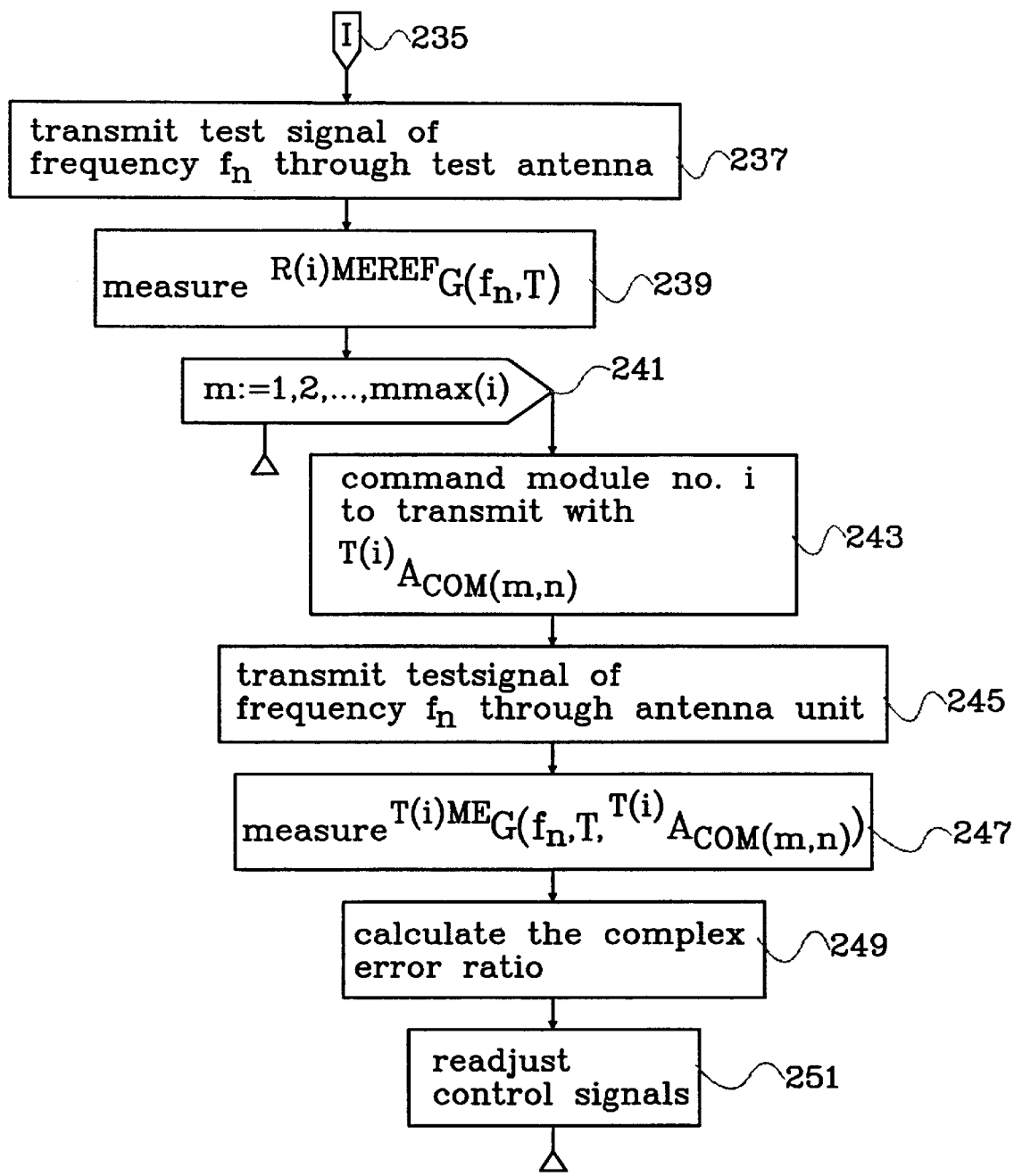
FIG. 9 shows a second part of a flow chart of a sub-step at calibration of an antenna system during transmission.

FIGS. 7, 8 and 9 show flow charts describing an example of how the calibration of the antenna system 23 at calibration is carried out according to the second method. The FIGS. 7, 8 and 9 are intended to illustrate an application of the antenna system 23 in which the values of the commanded complex amplifications at transmission $^{T(1)}A_{COM}$ ($1 \leq 1 \leq N$) for the T/R modules 27-1 and the carrier frequencies at which the antenna system 23 operate vary considerably faster than the temperature T. The control units 91-(1-N) therefore comprise calibration data associating adjustments of control signals c3-(1-N) and c4 -(1-N) for controlling the controllable attenuators 81-(1-N) and the controllable phase shifters 85-(1-N) to combinations of values for the commanded complex attenuations at transmission $^{T(1)}A_{COM}$ that occur for the application concerned and the carrier frequencies used by the system. When the temperature is changed a readjustment of the control signals c3-(1-N) controlling the controllable attenuators 81-(1-N) and the controllable phase shifters 85-(1-N) occurs, whereby calibration data in the control units 91-(1-N) is modified.

The calibration of the antenna system 23 at transmission is started in FIG. 7 with calibration of the reference module 27-$r$ at transmission, where in this case T/R module No. one 27-1 has been selected as a reference module 27-$r$. The calibration of the reference module 27-1 at transmission in FIG. 7 is first carried out for a first carrier frequency $f_1$ and the calibration process is then repeated for a predetermined number of other carrier frequencies $f_2$-$f_{nmax}$. This repetition is indicated in FIG. 7 by a block 183.

The calibration of the reference module 27-1 at transmission in FIG. 7 is carried out for an arbitrary carrier frequency, for example, carrier frequency No. n, $f_n$, according to the following.

The reference module 27-1 is commanded to transmit with the value for comparison at transmission $^{T(1)}A_{COM(0)}$ as indicated in FIG. 7 by a block 185. The other T/R modules 27-(2-N) are commanded to their isolated modes as indicated in FIG. 7 by a block 187. The control unit 41 controls the signal generator 47 in such a way that the signal switch 53 is set to its second position 57 and the oscillator 49 in such a way that it generates a first harmonic oscillating test signal of the frequency $f_n$. The first test signal is therefore transmitted through the antenna unit 25, as indicated in FIG. 7 by a block 189. The first test signal, transmitted through the antenna unit 25 is received through the test antenna 45, in that the receiver 61 receives a first received signal through its first signal input, said signal corresponding to the value for comparison at transmission $^{T(1)}A_{COM(0)}$ and the first test signal. The receiver 61 also receives the first test signal through its second signal input 67. A first complex amplification ratio at transmission for the reference module 27-1 $^{T(1)ME}G(f_n, T, ^{T(1)}A_{COM(0)})$ corresponding to the value for comparison at transmission $^{T(1)}A_{COM(0)}$ and the carrier frequency $f_n$, is measured by detection in the receiver 61, as indicated in FIG. 7 by a block 191.

The calibration of the reference module 27-1 for the carrier $f_n$ is first carried out for a first value of the commanded complex amplification at transmission $^{T(1)}A_{COM(1,n)}$ for the reference module 27-1 and is then repeated for a predetermined number of additional values of the commanded complex amplification at transmission $^{T(1)}A_{COM(2,n)}$-$^{T(1)}A_{COM(mmax(1),n)}$ for the reference module 27-1. This repetition is indicated in FIG. 7 by a block 193.

For an arbitrary one of these values, for example value No. m, of the commanded complex amplification at transmission $^{T(1)}A_{COM(m,n)}$ for the reference module 27-1, this calibration of the reference module 27-1 at transmission is carried out for the carrier frequency $f_n$ according to the following.

The reference module 27-1 is commanded to transmit with value No. m of the commanded complex amplification at transmission $^{T(1)}A_{COM(m,n)}$ for the reference module 27-1 as indicated in FIG. 7 by a block 195. The control unit 91-1 in the reference module 27-1 here adjusts the control signals c3-1 and c4-1 in dependence of calibration data. The other T/R modules 27-(2-N) remain commanded to their isolated modes. The control unit 41 controls the signal generator 47 so that a second harmonic oscillating test signal of a frequency $f_n$ is transmitted through the antenna unit 25 as indicated in FIG. 7 by a block 197. The second test signal transmitted through the antenna unit 25 is received by the test antenna 45. The receiver 61 hence receives a second received signal through its first signal input 63, said second received signal corresponding to value No. m of the commanded complex amplification at transmission $^{T(1)}A_{COM(m,n)}$ for the reference module 27-$i$ and the second test signal. The receiver 61 also receives the second test signal through its second signal input 67. A second complex amplification ratio at transmission $^{T(1)ME}G(f_n, T, ^{T(1)}A_{COM(m,n)})$ for the reference module 27-$i$, corresponding to value No. m of the commanded complex amplification at transmission $^{T(1)}A_{COM(m,n)}$ for the reference module 27-$i$ and the carrier frequency $f_n$ is measured by detection in the receiver 61 as indicated in FIG. 7 by a block 199.

The complex error ratio at transmission $$\frac{^{T(1)}E(f_n, T^{T(1)}, A_{COM(m,n)})}{^{T(1)}E(f_n, T^{T(1)}, A_{COM(0)})}$$

for the reference module 27-$i$, corresponding to the value for comparison at transmission $^{T(1)}A_{COM(0)}$, value No. m of the commanded complex amplification at transmission $^{T(1)}A_{COM(m,n)}$ for the reference module 27-1 and the carrier frequency $f_n$ is calculated in dependence of the first complex amplification ratio at transmission $^{T(1)ME}G(f,T,^{T(1)}A_{COM(0)})$ for the reference module 27-1 and the second complex amplification ratio at transmission $^{T(1)ME}G(f,T,^{T(1)}A_{COM(m,n)})$ at transmission for the reference module 27-1. This calculation is made using Equation (13). The calculation of the calculated complex error ratio at transmission $$\frac{^{T(1)}E(f_n, T^{T(1)}, A_{COM(m,n)})}{^{T(1)}E(f_n, T^{T(1)}, A_{COM(0)})}$$

for the reference module 27-1 is indicated in FIG. 7 by a block 201. In dependence of the calculated complex error ratio at transmission $$\frac{^{T(1)}E(f_n, T^{T(1)}, A_{COM(m,n)})}{^{T(1)}E(f_n, T^{T(1)}, A_{COM(0)})}$$

for the reference module 27-1, according to what was described above, a readjustment of the control signals c3-1 and c4-1 controlling the controllable attenuator 81-1 and the controllable phase shifter 85-1 is made in the reference module 27-1, and calibration data in the control unit 91-1 of the reference module 27-1 is modified in accordance with this. This readjustment of the control signals c3-1 and c4-1 is indicated in FIG. 7 by a block 203.

FIGS. 8 and 9 show a flow chart describing an example of how the other T/R modules 27-(2-N), that is, other than the reference module 27-1, are calibrated at transmission according to the second way of calibrating at transmission according to the invention. The calibration of the other T/R modules 27-(2-N) at transmission is first carried out for a first carrier frequency $f_1$ and then repeated for a predetermined number of further frequencies $f_2$-$f_{nmax}$, as indicated in FIG. 8 by a block 213.

For an arbitrary carrier frequency, for example carrier frequency No. n $f_n$, the calibration at transmission shown in FIGS. 8 and 9 is carried out according to the following.

The reference module 27-1 is commanded to its reference mode at reception, as indicated in FIG. 8 by a block 215. The other T/R modules 27-(2-N) are commanded to their isolated modes as indicated in FIG. 8 by a block 217. The control unit 41 controls the signal generator 47 in such a way that a harmonically oscillating first test signal of a frequency $f_n$ is transmitted through the test antenna 45. The first test signal transmitted through the test antenna 45 is received through the antenna unit 25, whereby the receiver 61 receives a first received signal through its second signal input 67, said first received signal corresponding to the reference mode of the reference module 27-1 at reception and the first test signal. The receiver 61 also receives the first test signal through its first signal input 63. A first complex amplification ratio at reception $^{R(1)MEREF}G(f_n,T)$ for the reference module 27-1, corresponding to the reference mode at reception for the reference module 27-1 and the carrier frequency $f_n$ is measured by detection in the receiver 61 as indicated in FIG. 8 by a block 221.

The calibration at transmission in FIG. 8 continues with the reference module 27-1 commanded to its transmit mode with the value for comparison at transmission $^{T(1)}A_{COM(0)}$, as indicated by a block 223. The other T/R modules 27-(2-N) at this stage remain in their isolated modes. The control unit 41 controls the signal generator 47 in such a way that a harmonic oscillating second test signal having a frequency $f_n$ is transmitted through the antenna unit 25 as indicated in FIG. 8 by a block 225. The second test signal transmitted through the antenna unit 25 is received through the test antenna 45, whereby the receiver 61 receives a second received signal through its first signal input 63, said second received signal corresponding to the reference module 27-1, the value for comparison at transmission $^{T(1)}A_{COM(0)}$ and the first test signal. A first complex amplification ratio at transmission $^{T(1)ME}G(f_n,T,^{T(1)}A_{COM(0)})$ for the reference module 27-1, corresponding to the value for comparison at transmission $^{T(1)}A_{COM(0)}$ and the carrier frequency $f_n$ is measured by detection in the receiver 61 as indicated in FIG. 8 by a block 227.

The calibration at transmission for the carrier frequency $f_n$ in FIGS. 8 and 9 is first carried out for T/R module No. 2 27-2 and is then repeated until the calibration at transmission has been carried out for the rest of the T/R modules 27-(3-N). This repetition is indicated in FIG. 8 by a block 229.

The calibration at transmission in FIGS. 8 and 9 for an arbitrary T/R module, for example T/R module No. $i$ 27-$i$ ($2 \leq i \leq N$), is made according to the following.

T/R module 27-$i$ is commanded to its reference mode at reception, as indicated in FIG. 8 by a block 231. The other T/R modules 27-$q$ ($1 \leq q \leq N$; $q \neq i$) are commanded to their isolated modes as indicated in FIG. 8 by a block 233. The flow chart of FIG. 8 now continues in FIG. 9, as indicated by a reference block 235. The control unit 41 controls the signal generator 47 in such a way that a harmonically oscillating third test signal of a frequency $f_n$ is transmitted through the test antenna 45 as indicated in FIG. 9 by a block 237. The third test signal transmitted through the test antenna 45 is received through the antenna unit 25, whereby the receiver 61 receives a third received signal through its second signal input 67, said third received signal corresponding to the reference mode of the T/R module No. $i$ 27-$i$ at reception and the third test signal. The receiver 61 also receives the third test signal through its first signal input 63. A first complex amplification ratio at reception $^{R(i)MEREF}G(f_n,T)$ for T/R module No. $i$ 27-$i$, corresponding to the reference mode at reception for T/R module No. $i$ 27-$i$ and the carrier frequency $f_n$ is measured by detection in the receiver 61 as indicated in FIG. 9 by a block 239.

In FIG. 9 T/R module No. $i$ 27-$i$ is calibrated at transmission for the carrier frequency $f_n$, first for a first value of the commanded complex amplification at transmission $^{T(i)}A_{COM(1,n)}$ for T/R module No. 27-$i$ and this is then repeated for a predetermined number of further values of the commanded complex amplification at transmission $^{T(i)}A_{COM(2,n)}$-$^{T(i)}A_{COM(mmax(i),n)}$ for T/R module No. $i$ 27-$i$. This repetition is indicated in FIG. 9 by a block 241.

For an arbitrary one of these values, for example value No. m, of the commanded complex amplification at transmission $^{T(i)}A_{COM(m,n)}$ for the reference module 27-$i$, this calibration of T/R module 27-*i* at transmission is carried out for the carrier frequency $f_n$ according to the following.

T/R module No. i 27-*i* is commanded to transmit with value No. m of the commanded complex amplification at transmission $^{T(i)}A_{COM(m,n)}$ for T/R module No. 27-*i* as indicated in FIG. 9 by a block 243. The other T/R modules 27-*q* ($1 \leq q \leq N$; $q \neq i$) remain in their isolated modes. The control unit 41 controls the signal generator 47 in such a way that a fourth harmonic oscillating test signal of the frequency $f_n$ is transmitted through the antenna unit 25, as indicated in FIG. 9 by a block 245. The fourth test signal, transmitted through the antenna unit 25 is received through the test antenna 45, in that the receiver 61 receives a fourth received signal through its first signal input 63, said signal corresponding to a value m of the commanded complex amplification at transmission $^{T(i)}A_{COM(m,n)}$ for T/R module No. i 27-*i* and the fourth test signal. The receiver 61 also receives the fourth test signal through its second signal input 67. A first complex amplification ratio at transmission $^{T(i)ME}G(f_n, T,^{T(i)}A_{COM(m,n)})$ for the T/R module No. i 27-*i*, corresponding to value No. m of the commanded complex amplification at transmission $^{T(i)}A_{COM(m,n)}$ for T/R module No. i 27-*i* and the carrier frequency $f_n$, is measured by detection in the receiver 61 as indicated in FIG. 9 by a block 247.

In FIG. 9 a calculation is carried out of the complex error ratio at transmission $$\frac{^{T(i)}E(f_n, T^{T(i)}, A_{COM(m,n)})}{^{T(i)}E(f_n, T^{T(i)}, A_{COM(0)})}$$

for T/R module No. i 27-*i*, corresponding to value No. m of the commanded complex amplification at transmission $^{T(i)}A_{COM(m,n)}$ for T/R module No. i, the value for comparison at transmission $^{T(1)}A_{COM(0)}$ and the carrier frequency $f_n$, as indicated by a block 249. When calculating the complex error ratio at transmission $$\frac{^{T(i)}E(f_n, T^{T(i)}, A_{COM(m,n)})}{^{T(r)}E(f_n, T^{T(r)}, A_{COM(0)})}$$

for T/R module No. i 27-*i*, Equation (17) is used. This calculation is therefore carried out in dependence of: the first complex amplification ratio at reception $^{R(1)MEREF}G(f_n,T)$ for the reference module 27-*i*, the first complex amplification ratio at transmission $^{T(1)Me}G(f,T,^{T(1)}A_{COM(0)})$ for the reference module 27-1, the first complex amplification ratio at reception $^{R(i)MEREF}G(f_n,T)$ for T/R module No. i and the first complex amplification ratio at transmission $^{T(i)ME}G(f, T,^{T(i)}A_{COM(m,n)})$ for T/R module No. i. The complex amplifications at reception $^{R(1)REF}A(f_n,T)$ and $^{R(i)REF}A(f_n,T)$ for the reference modes for the reference module 27-1 and T/R module No. i 27-*i* are, as described above, known parameters in this context. In dependence of the calculated complex error ratio at transmission for T/R module No. i 27-*i*, a readjustment of the control signals c3-*i* and c4-*i* controlling the controllable attenuator 81-*i* and the controllable phase shifter 85-*i* is carried out, as indicated in FIG. 9 by a block 251. This readjustment of the control signals c3-*i* and c4-*i* is made in accordance with what has been described above, whereby calibration data in the control unit 91-*i* is modified.

If the T/R modules 27(1-N) have been arranged with their reference modes at transmission, of course the antenna system 23 may be calibrated at reception in another way, this other way of calibrating at reception corresponding to the other way of calibrating at transmission. Thus, one of the T/R modules, for example T/R module No. r 27-*r*, may be selected as a reference module and a value of the commanded complex amplification at reception for the reference module 27-*r* may be selected as a value for comparison at reception $^{R(r)}A_{COM(0)}$. An equation corresponding to Equation (13) can be deduced, so that $$\frac{^{R(r)}E(f, T^{R(r)}, A_{COM})}{^{R(r)}E(f, T^{R(r)}, A_{COM(0)})} = \frac{^{R(r)ME}G(f, T^{R(r)}, A_{COM})}{^{R(r)ME}G(f, T^{R(r)}, A_{COM(0)})} \cdot \frac{^{R(r)}A_{COM(0)}}{^{R(r)}A_{COM}}. \quad (18)$$

The left part of Equation (18) is a complex error ratio at reception for the reference module 27-*r*, corresponding to the frequency f, the commanded complex amplification at reception $^{R(r)}A_{COM}$ for the reference module 27-*r* and the value for comparison at reception $^{R(r)}A_{COM(0)}$. The right part of Equation (18) comprises only known parameters, so that the complex error ratio at reception $$\frac{^{R(r)}E(f, T^{R(r)}, A_{COM})}{^{R(r)}E(f, T^{R(r)}, A_{COM(0)})}$$

for the reference module 27-*r* may be calculated using Equation (18).

The antenna system 23 is, as will be understood by a person skilled in the art, calibrated at reception if the complex error amplifications $^{R(1)}E(f,T,^{R(1)}A_{COM})$ ($1 \leq l \leq N$) at reception are the same for all T/R modules 27-(1-N). Using the second method of calibration at reception it is therefore, in a corresponding way to the second method of calibration at transmission, the intention that the complex error amplifications at reception $^{R(1)}E(f,T,^{R(1)}A_{COM})$ for the T/R modules 27-(1-N) are to correspond to the complex error amplification of the reference module 27-*r* at reception $^{R(r)}E(f,T,^{R(r)}A_{COM(0)})$, corresponding to the value for comparison at reception $^{R(r)}A_{COM(0)}$. A necessary condition for this to be fulfilled is that the complex error ratio at transmission $$\frac{^{R(r)}E(f, T^{R(r)}, A_{COM})}{^{R(r)}E(f, T^{R(r)}, A_{COM(0)})}$$

for the reference module 27-*r*, corresponding to the frequency f, the commanded complex amplification at reception $^{R(r)}A_{COM}$ for the reference module and the value for comparison at reception $^{R(r)}A_{COM(0)}$ is equal to one. When the complex error ratio at reception $$\frac{^{R(r)}E(f, T^{R(r)}, A_{COM})}{^{R(r)}E(f, T^{R(r)}, A_{COM(0)})}$$

for the reference module 27-*r* has been calculated for a value of the commanded complex amplification at reception $^{R(r)}A_{COM}$ for the reference module 27-*r*, the control signals c3-*r* and c4-*r* controlling the controllable attenuator 81-*r* and the controllable phase shifter 85-*r* in the reference module 27-*r* may be readjusted in dependence of the calculated complex error ratio at reception $$\frac{^{R(r)}E(f, T^{R(r)}, A_{COM})}{^{R(r)}E(f, T^{R(r)}, A_{COM(0)})}$$

for the reference module 27-*r*. In a corresponding way as with the second method of calibrating at transmission, the control signals c3-*r* and c4-*r* are to be readjusted so that the amplification of the reference module 27-*r* is changed by a factor corresponding to one divided by the value of the complex error ratio at reception $$\left| \frac{{}^{R(r)}E(f, T^{R(r)}, A_{COM})}{{}^{R(r)}E(f, T^{R(r)}, A_{COM(0)})} \right|$$

and so that the phase shift of the reference module 27-*r* is reduced corresponding to an argument to the complex error ratio at reception $$\arg\left\{ \frac{{}^{R(r)}E(f, T^{R(r)}, A_{COM})}{{}^{R(r)}E(f, T^{R(r)}, A_{COM(0)})} \right\}$$

for the reference module 27-*r*.

For the other T/R modules 27-*q* ($1 \leq q \leq N$; $q \neq r$) the control signals c3-*q* and c4-*q* to the controllable attenuators 81-*q* and the controllable phase shifters 85-*q* are to be adjusted so that the complex error amplifications ${}^{R(q)}E(f,T^{R(q)}A_{COM})$ at reception for these T/R modules 27-*q* correspond to the complex error amplification at reception ${}^{R(r)}E(f,T^{R(r)}A_{COM(0)})$ for the reference module 27-*r*, corresponding to the value for comparison at reception ${}^{R(r)}A_{COM(0)}$. For this purpose, in a corresponding way to the one used for the second method of calibrating at transmission, an equation will now be deduced, from which this readjustment can be carried out for T/R module No. i 27-*i*.

An equation corresponding to Equation (14) for the second method for calibration at transmission may be deduced in a simple way, so that:

$$\frac{{}^{R(i)}E(f, T^{R(i)}, A_{COM})}{{}^{R(r)}E(f, T^{R(r)}, A_{COM(0)})} = \tag{19}$$

$$\frac{{}^{R(i)ME}G(f, T^{R(i)}, A_{COM})}{{}^{R(r)ME}G(f, T^{R(r)}, A_{COM(0)})} \cdot \frac{H_{ar}(f)}{H_{ai}(f)} \cdot \frac{{}^{R(r)}A_{COM(0)}}{{}^{R(i)}A_{COM}}.$$

The right part of Equation (19) comprises three ratios. The second ratio $$\frac{H_{ar}(f)}{H_{ai}(f)}$$

in the right part of Equation (19) is unknown, while the two other ratios in the right part of Equation (19) consist of known parameters. The second ratio in the right part of Equation (19) must be expressed in terms of known parameters. An equation, corresponding to Equation (16) for the second way of calibrating at transmission, is therefore deduced, so that:

$$\frac{H_{ra}(f)}{H_{ia}(f)} = \frac{{}^{T(r)MEREF}G(f, T)}{{}^{T(i)MEREF}G(f, T)} \cdot \frac{{}^{T(i)REF}\Lambda(f, T)}{{}^{T(r)REF}\Lambda(f, T)}. \tag{20}$$

The reciprocity mentioned above causes $H_{ai}(f) = H_{ia}$ and $H_{ar}(f) = H_{ra}(f)$. The unknown second ratio $$\frac{H_{ar}(f)}{H_{ai}(f)}$$

in the right part of Equation (19) is thus equal to the left part of Equation (20). The right part of Equation (20) only comprises known parameters and may therefore replace the unknown second ratio $$\frac{H_{ar}(f)}{H_{ai}(f)}$$

in Equation (19), so that $$\frac{{}^{R(i)}E(f, T^{R(i)}, A_{COM})}{{}^{R(r)}E(f, T^{R(r)}, A_{COM(0)})} = \frac{{}^{R(i)ME}G(f, T^{R(i)}, A_{COM})}{{}^{R(r)ME}G(f, T^{R(r)}, A_{COM(0)})} \cdot \tag{21}$$

$$\frac{{}^{T(r)MEREF}G(f, T)}{{}^{T(i)MEREF}G(f, T)} \cdot \frac{{}^{T(i)REF}\Lambda(f, T)}{{}^{T(r)REF}\Lambda(f, T)} \cdot \frac{{}^{R(r)}A_{COM(0)}}{{}^{T(i)}A_{COM}}.$$

Equation (21) corresponds to Equation (17) which was used for the other way of calibrating at transmission. The left part of Equation (21) is a complex error ratio at reception $$\frac{{}^{R(i)}E(f, T^{R(i)}, A_{COM})}{{}^{R(r)}E(f, T^{R(r)}, A_{COM(0)})}$$

for T/R module No. i 27-*i*, corresponding to the frequency f, the commanded complex amplification at reception ${}^{R(i)}A_{COM}$ for T/R module No. i 27-*i* and the value for comparison at reception ${}^{R(r)}A_{COM(0)}$. The right part of Equation (21) contains only known parameters, and the complex error ratio at reception $$\frac{{}^{R(i)}E(f, T^{R(i)}, A_{COM})}{{}^{R(r)}E(f, T^{R(r)}, A_{COM(0)})}$$

for T/R module No. i 27-*i* can therefore be calculated using Equation (21). The readjustment of the control signals c3-*i* and c4-*i* controlling the controllable attenuator 81-*i* and the controllable phase shifter 85-*i* in T/R module No. i 27-*i* is made in such a way that the amplification for T/R module No. i 27-*i* is changed by a factor corresponding to the absolute value of the complex error ratio at reception $$\left| \frac{{}^{R(i)}E(f, T^{R(i)}, A_{COM})}{{}^{R(r)}E(f, T^{R(r)}, A_{COM(0)})} \right|$$

for T/R module No. i 27-*i* and in such a way that the phase shift for T/R module No. i 27-*i* is reduced corresponding to an argument to the complex error ratio at reception $$\arg\left\{ \frac{{}^{R(i)}E(f, T^{R(i)}, A_{COM})}{{}^{R(r)}E(f, T^{R(r)}, A_{COM(0)})} \right\}$$

for T/R module No. i 27-*i*.

Considering Equation (21) it is seen that the calibration of the antenna system 23 during reception according to the second method implies both the transmission and the reception of test signals through the antenna unit 25.

Equations corresponding to Equation (21) are, of course valid for the other T/R modules 27-*q* ($1 \leq q \leq N$; $q \neq i,r$).

FIGS. 7, 8 and 9 illustrate, by means of flow charts, a detailed example of how the calibration of the antenna system 23 at transmission was carried out according to the second method of calibration at transmission. FIGS. 7, 8 and 9 can also be said to illustrate the calibration of the antenna system 23 at reception according to the second method of calibrating at reception. This is of course only true if FIGS.

7, 8 and 9 are modified in the appropriate way; in calibration at reception according to the second method test signals are transmitted through the antenna unit 25 and received through the test antenna when, in FIGS. 7, 8 and 9, test signals are transmitted through the test antenna and received through the antenna unit, and vice versa.

Figure 10:
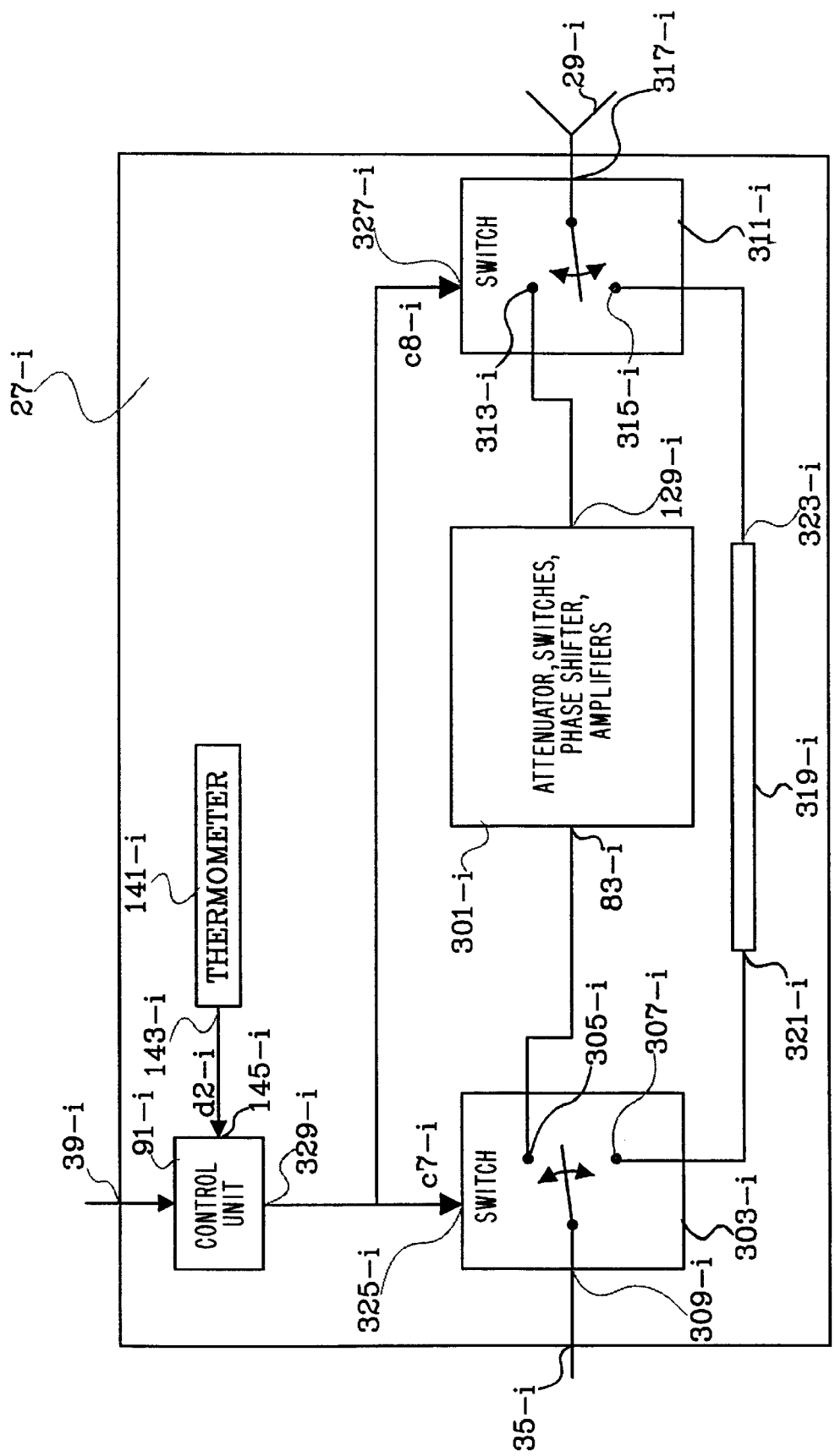
FIG. 10 is a block diagram of a construction of a T/R module.

As stated above, the complex amplifications at reception and transmission $^{R(1)REF}\Lambda(f,T)$ and $^{T(1)REF}\Lambda(f,T)$ ($1 \leq 1 \leq N$) vary for the reference modes at reception and transmission for the T/R modules 27-(1-N) with the frequency f and the temperature T. In practice, however, there is also a direct time dependence of the complex amplifications at reception and transmission $^{R(1)REF}\Lambda(f,T)$ and $^{T(1)REF}\Lambda(f,T)$ ($1 \leq 1 \leq N$) for the reference modes at reception and transmission for the T/R modules 27-(1-N). This direct time dependence is caused by component drifting, caused by ageing, in the electronic circuitry, for example, in the amplifiers 103-(1-N) and 109-(1-N) and the controllable switches 99-(1-N), 113-(1-N) and 125-(1-N). Because of the direct time dependence the surveys of the complex amplifications at reception and transmission $^{R(1)REF}\Lambda(f,T)$ and $^{T(1)REF}\Lambda(f,T)$ ($1 \leq 1 \leq N$) for the reference modes for the T/R modules 27-(1-N) must be made again at certain time intervals for the calibration methods described above to function satisfactorily. FIG. 10 therefore shows how the construction of T/R module No. i 27-i described above should be modified to reduce or eliminate the need for making new surveys. The construction of T/R module No. i 27-i in FIG. 10 is largely the same as the construction of T/R module No. i 27-i in FIG. 4. The same reference numerals are therefore used in both Figures of the elements that are basically the same.

In FIG. 10, units corresponding to a number of the elements in FIG. 4 have been indicated collectively by a block 301-i. The block 301-i thus symbolizes the units corresponding to the controllable attenuator 81-i, the controllable phase shifter 85-i, the first controllable switch 99-i, the second controllable switch 113-i, the third controllable switch 125-i, the first amplifier 103-i and the second amplifier 109-i in FIG. 4.

T/R module No. i 27-i in FIG. 10 comprises a fourth controllable switch 303-i having a signal connection 309-i. The signal connection 309-i of the fourth controllable switch 303-i is connected to an analogue signal connection 35-i in T/R module No. i 27-i in FIG. 10. The fourth controllable switch 303-i can be set in a first position 305-i, whereby the signal connection 309-i of the fourth controllable switch 303-i is connected to a signal connection 83-i in a controllable attenuator, corresponding to the controllable attenuator 81-i in FIG. 4. The fourth controllable switch 303-i can be set to a second position 307-i, in which the signal connection 309-i of the fourth controllable switch 303-i is connected to a first signal connection 321-i of a transmission connector 319-i.

T/R module No. i 27-i in FIG. 10 comprises a fifth controllable switch 311-i having a signal connection 317-i. The signal connection 317-i of the fifth controllable switch 311-i is connected to a radiation element 29-i in T/R module No. i 27-i in FIG. 10. The fifth controllable switch can be set to a first position, whereby the signal connection 317-i of the fifth controllable switch 311-i is connected to first position 129-i of a third controllable switch, corresponding to the third controllable switch 125-i in FIG. 4. The fifth controllable switch 311-i can be set to at second position 315-i, in which the signal connection 317-i of the fifth controllable switch 311-i is connected to a second signal connection 323-i of the transmission connector 319-i.

The fourth and the fifth controllable switch comprise control signal inputs 325-i and 327-i, connected to a corresponding third set of control signal outputs 328-i in a control unit 91-i in T/R module No. i 27-i in FIG. 10. The control unit 91-i in FIG. 10 also comprises a first and a second set of control signal outputs, corresponding to the first and the second set of control signal outputs 93-i and 139-i in FIG. 4. The first and the second set of control signal outputs are, however, not shown in FIG. 10 for clarity reasons. The control unit 91-i in FIG. 10 controls the fourth controllable switch 303-i and the fifth controllable switch 311-i by means of control signals c7-i and c8-i. The control unit 91-i in FIG. 10 can therefore control whether or not the fourth and the fifth controllable switch 303-i and 311-i are to be set in their first positions 305-i and 313-i or in their second positions 307-i and 315-i.

When the fourth and the fifth controllable switch 303-i and 311-i are set to their first positions 305-i and 313-i the construction of T/R module No. i 27-i in FIG. 10 functions in a corresponding way to the construction of T/R module No. i 27-i in FIG. 4. When the fourth an fifth controllable switch 303-i and 311-i are set to their second positions 307-i and 315-i the electronic circuitry in the block 301-i are bypassed by the transmission conductor 319-i.

The construction of T/R module No. i 27-i in FIG. 10 is commanded to its reference mode at reception or transmission when the fourth and the fifth controllable switch 303-i and 311-i are set to their second positions 307-i and 315-i. A complex amplification at reception or transmission eq or eq for the reference mode at reception or transmission for T/R module No. i 27-i in FIG. 10 is determined by complex amplifications in the fourth and the fifth controllable switch 303-i and 311-i and in the transmission conductor 319-i. The complex amplifications at reception or transmission $^{R(i)REF}\Lambda(f,T)$ or $^{T(i)REF}\Lambda(f,T)$ for the reference modes at reception or transmission for the construction of T/R module No. i 27-i in FIG. 10 is not as temperature- and time-dependent as the construction of T/R module No. i 27-i in FIG. 4, since the circuitry in the block 301-i does not affect the complex amplifications at reception or transmission $^{R(i)REF}\Lambda(f,T)$ or $^{T(i)REF}\Lambda(f,T)$ for the reference modes at reception or transmission for T/R module No. i 27-i, when it is designed as shown in FIG. 10. The complex amplification of the transmission conductor 319-i is relatively independent of the temperature and the time. The complex amplifications for the fourth and the fifth controllable switch 303-i and 311-i are to some degree dependent on the temperature and the time.

The complex amplification at reception $^{R(i)REF}\Lambda(f,T)$ for the reference mode at reception of T/R module No. i 27-i in FIG. 10 has been surveyed as a function of the frequency f and the temperature T, and data from this survey is arranged in the control unit 91-i. Since the temperature dependence of the complex amplification at reception $^{R(i)REF}\Lambda(f,T)$ for the reference mode at reception for the construction of T/R module No. i 27-i in FIG. 10 is not as pronounced as for the construction shown in FIG. 4, a smaller amount of data needs to be stored in the control unit 91-i than was the case for the construction shown in FIG. 4. Since the time dependence of the complex amplification at reception $^{R(i)REF}\Lambda(f,T)$ for the reference mode at reception for the construction of T/R module No. i 27-i in FIG. 10 is not as pronounced as for the construction shown in FIG. 4, the survey of the complex amplification at reception $^{R(i)REF}\Lambda(f,T)$ for the reference mode at reception does not have to be carried out again as often. If the transmission conductor 319-i and the fourth and the fifth controllable switch 303-i and 311-i are sufficiently time stable, the survey may never have to be repeated. What is considered sufficiently time stable is of course determined by the demand for accuracy in the antenna system 23. What has been said here about the complex amplification at reception $^{R(i)REF}A(f,t)$ for the reference mode at reception for T/R module no. i 27-*i* in FIG. 10 is of course, with appropriate modifications, also valid for the complex amplification at transmission $^{T(i)REF}A(f,t)$ for the reference mode at transmission for T/R module No. i 27-*i* in FIG. 10.

What is claimed is:

1. A method for the calibration of an antenna system during reception arranged to utilize at least one carrier frequency, said antenna system including a test antenna, an electrically controlled antenna having at least two modules with control means for control of received amplitude and phase processing factors for the respective module and means for generating control signals to the control means, said control signals being associated with at least one value of amplitude and phase processing factors at reception for the respective module, and each of the modules being arranged with a commandable isolated mode, comprising the following steps:

a) arranging, for each module, a commandable reference mode at reception, for which the amplitude and phase processing factors at the reception for the module are known; and b) calibrating, at reception, substantially all the modules for at least one of the carrier frequencies based on an investigation of the received signal by transmitting test signals through the test antenna and receiving them through the electrically controlled antenna, whereby the effect of an unknown signal influence on the test signals is eliminated by use of the reference modes at reception for the modules.

2. A method according to claim 1, wherein the step b) in turn comprises the following substeps:

c) selecting one of the carrier frequencies;

d) selecting one of the modules;

e) selecting a first test signal, comprising the selected carrier frequency;

f) transmitting the selected first test signal through the test antenna;

g) receiving the selected first test signal transmitted through the test antenna, through the electrically controlled antenna with the selected module commanded to its reference mode at reception and with the other modules commanded to their isolated modes, whereby a first received signal, corresponding to the reference mode at reception for the selected module (27-*i*) and the selected first test signal is obtained;

h) comparing the first received signal and the selected first test signal;

i) calibrating at reception of the selected module for the selected carrier frequency and said at least value of the one amplitude and phase processing factors at reception for the selected module, using the comparison, according to the substep h), between the first received signal and the selected first test signal, to eliminate the influence of the unknown signal influence; and j) repeating the substeps d) through i) until substantially all the modules have been selected.

3. A method according to claim 2, wherein the step b) in turn comprises the following substeps:

k) repeating the substeps c) through j) until a predetermined number of the carrier frequencies has been selected.

4. A method according to claim 3, wherein the substep p) in turn comprises the following substep:

t) measuring a second amplitude and phase processing factor ratio at reception for the selected module, corresponding to the selected carrier frequency and the selected value of the commanded amplitude and phase processing factors at reception for the selected module.

5. A method according to claim 4, wherein the selection of the selected second test signal in the substep m) implies that a second narrowband oscillator signal is selected as the second test signal, the second narrowband oscillator signal having a centre frequency substantially corresponding to the selected carrier frequency.

6. A method according to claim 5, wherein the substep t) in turn comprises the following substeps:

u) detecting a phase difference between the second received signal and the selected second test signal; and v) detecting an amplitude ratio between the second received signal and the selected second test signal, said second amplitude and phase processing factor ratio at reception for the selected module having an argument corresponding to the phase difference detected in the substep u) and an absolute value corresponding to the amplitude ratio detected in the substep v).

7. A method according to claim 4, wherein the selection of the selected second test signal in the substep m) implies that a second broadband signal is selected as the selected second test signal, said second broadband signal comprising the selected carrier frequency.

8. A method according to claim 7, wherein the substep t) in turn comprises the following substeps:

x) generating a Fourier transform of the second received signal;

y) generating a Fourier transform of the selected second test signal; and z) generating a second ratio value corresponding to a ratio between the value of the Fourier transform according to the substep x), at the selected carrier frequency and the value of the Fourier transform according to the substep y) at the selected carrier frequency, said second amplitude and phase processing factor ratio at reception for the selected module corresponding to the second ratio value.

9. A method according to claim 2, wherein the substep i) in turn comprises the following substeps:

l) selecting a value for the amplitude and phase processing factors at reception for the selected module;

m) selecting a second test signal comprising the selected carrier frequency;

n) transmitting the selected second test signal through the test antenna;

o) receiving the selected second test signal transmitted through the test antenna through the electrically controlled antenna, with the selected module commanded to reception with the selected value of the amplitude and phase processing factors at reception for the selected module and with the other modules commanded to their isolated modes, whereby a second received signal, corresponding to the selected value of the commanded amplitude and phase processing factors at reception for the selected module and the selected second test signal is obtained;

p) comparing the second received signal and the selected second test signal;

q) generating a value corresponding to a complex error amplification at reception for the selected module, this being done in dependence of the comparison, according to substep h), of the first received signal and the selected first test signal and the comparison, according to substep p) of the second received signal and the selected second test signal; and r) switching the control signals associated with the selected value of the amplitude and phase processing factors at reception for the selected module to the control means for controlling the received amplitude and phase processing factors for the selected module in dependence of the value corresponding to the received amplitude and phase processing factor error for the selected module.

10. A method according to claim 9, wherein the substep i) in turn comprises the following substep:

s) repeating the substeps l) through r) until a predetermined number of values of the amplitude and phase processing factors at reception for the selected module have been selected.

11. A method according to claim 9, wherein the switching of the control signals to the control means in the substep r) implies that this is done in such a way that the phase shift of the selected module at reception is reduced corresponding to an argument to the complex error amplification at reception and in such a way that the amplification of the selected module at reception is changed by a factor corresponding to one divided by the value of the received amplitude and phase processing factor error.

12. A method according to claim 2, wherein the substep h) in turn comprises the following substep:

aa) measuring a first amplitude and phase processing factor ratio at reception for the selected module, corresponding to the reference mode at reception for the selected module and the selected carrier frequency.

13. A method according to claim 12, wherein the selection of the selected first test signal in the substep e) implies the selection of a first narrowband oscillator signal as the first selected test signal, said first narrowband oscillator signal having a centre frequency substantially corresponding to the selected carrier frequency.

14. A method according to claim 13, wherein the substep aa) in turn comprises the following substeps:

ab) detecting a phase difference between the first received signal and the selected first test signal; and ac) detecting an amplitude ratio between the first received signal and the selected first test signal, the first amplitude and phase processing factor ratio at reception for the selected module having an argument corresponding to the phase difference detected in the substep ab) and an argument corresponding to the amplitude ratio detected in the substep ac).

15. A method according to claim 12, wherein the selection of the selected first test signal in the substep e) implies the selection of a first broadband signal as the selected first test signal, the first broadband signal comprising the selected carrier frequency.

16. A method according to claim 15, wherein the substep aa) in turn comprises the following substeps:

ad) generating a Fourier transform of the first received signal;

ae) generating a Fourier transform of the selected first test signal; and af) generating a first ratio value corresponding to a ratio of the value of the Fourier transform according to the substep ad) at the selected carrier frequency and the value of the Fourier transform according to the substep ae) at the selected carrier frequency, the first amplitude and phase processing factor ratio at reception for the selected module corresponding to the first ratio value.

17. A method according to claim 1, wherein the step a) in turn comprises the following substeps:

ag) selecting for each module a setting of the control signal controlling the control means for controlling the received amplitude and phase processing factors for the respective module;

ah) making a survey of the received amplitude and phase processing factors for the modules corresponding to the selected settings for the control signals;

ai) storing data corresponding to the survey according to the substep ah) in the antenna system; and aj) arranging at least one temperature measuring device in the antenna system.

18. A method for the calibration of an antenna system during transmission arranged to utilize at least one carrier frequency, said antenna system comprising a test antenna, an electrically controlled antenna having at least two modules with control means for the control of transmitted amplitude and phase processing factors for the respective module and means for generating control signals to the control means, said control signals being associated with at least one value of said transmitted amplitude and phase processing factors at transmission for the respective module, and each of the modules being arranged with a commandable isolated mode, comprising the following steps:

a) arranging, for each module, a commandable reference mode at reception, for which the amplitude and phase processing factors at the reception for the module is known; and b) calibrating, at transmission, substantially all the modules for at least one of the carrier frequencies based on an investigation of the transmitted signal by transmitting test signals through the test antenna and receiving them through the electrically controlled antenna, and by transmitting test signals through the electrically controlled antenna and receiving them through the test antenna, whereby the effect of an unknown signal influence on the test signals is eliminated by use of the reference modes at reception for the modules.

19. A method according to claim 18, wherein the step b) in turn comprises the following substeps:

c) selecting one of the carrier frequencies;

d) selecting one of the modules as a reference module;

e) selecting a value for the commanded amplitude and phase processing factors at transmission for the reference module as a value for comparison at transmission;

f) calibrating the reference module during transmission for the selected carrier frequency in relationship to the transmitted amplitude and phase processing factors for the reference module, corresponding to the selected carrier frequency and the value for comparison at transmission; and g) calibrating substantially all the modules in addition to the reference module, at transmission for the selected carrier frequency in relationship to the transmitted amplitude and phase processing factors for the reference module, corresponding to the selected carrier frequency and the value for comparison at transmission.

20. A method according to claim 19, wherein the step b) in turn comprises the following substeps:

h) repeating the substeps c) through g) until a predetermined number of the carrier frequencies has been selected.

21. A method according to claim 19, wherein the substep f) in turn comprises the following substeps:
   i) selecting a first test signal, comprising the selected carrier frequency;
   j) transmitting the selected first test signal through the electrically controlled antenna with the reference module commanded to its transmission mode with the value for comparison at transmission and with the other modules commanded to their isolated modes;
   k) receiving the first test signal, transmitted from the electrically controlled antenna by the test antenna, whereby a first received signal, corresponding to the reference module the value for comparison at transmission and the first test signal are obtained;
   l) comparing the first received signal and the selected first test signal;
   m) calibrating, at transmission, the reference module in relationship to the transmitted amplitude and phase processing factors for the reference module, corresponding to the selected carrier frequency and the value for comparison at transmission, for the selected carrier frequency and at least one value of the amplitude and phase processing factors at transmission for the reference module, utilizing the comparison according to the substep l) of the first received signal and the selected first test signal.

22. A method according to claim 21, wherein the substep m) in turn comprises the following substeps:
   n) selecting a value for the amplitude and phase processing factors at reception for the reference module;
   o) selecting a second test signal comprising the selected carrier frequency;
   p) transmitting the selected second test signal, through the electrically controlled antenna, with the reference module commanded to its transmission mode with the selected value of the amplitude and phase processing factors at transmission for the reference module and with the other modules commanded to their isolated modes;
   q) receiving the selected second test signal transmitted from the electrically controlled antenna by the test antenna whereby a second received signal, corresponding to the selected value of the amplitude and phase processing factor at transmission for the reference module and the second test signal, is obtained;
   r) comparing the second received signal to the selected second test signal;
   s) generating a value corresponding to a amplitude and phase processing factor error ratio at transmission for the reference module, corresponding to the selected carrier frequency, the selected value of the amplitude and phase processing factors at transmission for the reference module and the value for comparison at transmission, said generation being carried out in dependence of the comparison, according to the substep l), of the first received signal and the selected first test signal and the comparison, according to the substep r) of the second received signal and the selected second test signal; and
   t) switching the control signals associated with the selected value of amplitude and phase processing factors at transmission for the reference module to the control means for controlling the transmitted amplitude and phase processing factors for the reference module, this being done in dependence of the value corresponding to the amplitude and phase processing factor error ratio at transmission for the reference module.

23. A method according to claim 22, wherein the substep m) in turn comprises the following substep:
   u) repeating the substeps n) through t) until a predetermined number of values of the amplitude and phase processing factors at transmission for the reference module have been selected.

24. A method according to claim 22, wherein the switching of the control signals to the control means in the substep
   t) implies that this is done in such a way that the phase shift of the reference module is reduced corresponding to an argument to the amplitude and phase processing factor error ratio at transmission for the reference module and in such a way that the amplification of the reference module is changed by a factor corresponding to one divided by an absolute value of the complex error ratio at reception for the reference module.

25. A method according to claim 19, wherein the step g) in turn comprises the following substeps:
   v) selecting a third test signal, comprising the selected carrier frequency;
   w) transmitting the selected third test signal through the test antenna;
   x) receiving the selected third test signal transmitted through the test antenna, through the electrically controlled antenna by the reference module commanded to its reference mode at reception and with the other modules commanded to their isolated modes, whereby a third received signal, corresponding to the reference mode at reception for the reference module and the selected third test signal is obtained;
   y) comparing the third received signal and the selected third test signal;
   z) selecting a fourth test signal comprising the selected carrier frequency;
   aa) transmitting the selected fourth test signal through the electrically controlled antenna with the reference module commanded to its transmission mode with the value for comparison at transmission and with the other modules commanded to their isolated modes;
   ab) receiving the fourth test signal, transmitted from the electrically controlled antenna by the test antenna, whereby a fourth received signal, corresponding to the reference module, the value for comparison at transmission and the first test signal is obtained;
   ac) comparing the fourth received signal to the selected fourth test signal;
   ad) selecting one of the modules in addition to the reference module;
   ae) calibrating, at transmission, the selected module in relationship to the amplitude and phase processing factors of the reference module, corresponding to the selected carrier frequency and the value for comparison at transmission, for the selected carrier frequency and at least one value of amplitude and phase processing factors at transmission for the selected module, utilizing the comparison, according to the substep ac) of the fourth received signal and the fourth test signal, and the comparison, according to the substep y), between the third received signal and the third test signal to eliminate the effects of the unknown signal influence; and
   af) repeating the substeps ab) and ac) until substantially all the modules have been selected.

26. A method according to claim 25, wherein the substep ac) in turn comprises the following substeps:

ag) selecting a fifth test signal;

ah) transmitting the selected fifth test signal through the test antenna;

ai) receiving the selected fifth test signal transmitted through the test antenna, through the electrically controlled antenna with the selected module commanded to its reference mode at reception and with the other modules commanded to their isolated modes, whereby a fifth received signal, corresponding to the reference mode at reception for the selected module and the selected fifth test signal is obtained;

aj) comparing the fifth received signal and the selected fifth test signal;

ak) selecting a value of amplitude and phase processing factors at transmission for the selected module;

al) selecting a sixth test signal comprising the selected carrier frequency;

am) transmitting the selected sixth test signal, through the electrically controlled antenna, with the selected module commanded to its transmission mode with the selected value of amplitude and phase processing factors at transmission for the selected module and with the other modules commanded to their isolated modes;

an) receiving the selected sixth test signal transmitted from the electrically controlled antenna by the test antenna whereby a sixth received signal, corresponding to the selected value of amplitude and phase processing factors at transmission for the selected module and the selected sixth test signal, is obtained;

ao) comparing the sixth received signal to the selected sixth test signal;

ap) generating a value corresponding to an amplitude and phase factor error ratio at transmission for the selected module, corresponding to the selected carrier frequency, the selected value of amplitude and phase processing factors at transmission for the selected module and the value for comparison at transmission, said generation being carried out in dependence of the comparison, according to the substep y), of the third received signal and the selected third test signal and the comparison, according to the substep ac) of the fourth received signal and the selected fourth test signal, the comparison according to the substep aj) of the fifth received signal and the fifth test signal, and the comparison according to the substep ao) of the sixth received signal and the selected sixth test signal; and aq) switching the control signals associated with the selected value of amplitude and phase processing factors at transmission for the selected module to the control means for controlling the transmitted amplitude and phase processing factors for the selected module, this being done in dependence of the value corresponding to the amplitude and phase processing factor error ratio at transmission for the selected module.

27. A method according to claim 26, wherein the substep ac) in turn comprises the following substep:

ar) repeating the substeps ak) through aq) until a predetermined number of values of amplitude and phase processing factors at reception for the selected module have been selected.

28. A method according to claim 26, wherein the switching of the control signals to the control means in the substep aq) implies that the control signals are switched in such a way that the phase shift of the selected module is reduced corresponding to an argument to the amplitude and phase processing factor error ratio for the selected module at reception and in such a way that signal modification by the selected module is changed by a factor corresponding to one divided by the value of the amplitude and phase processing factor error ratio at transmission for the selected module.

29. A method for the calibration of an antenna system during transmission, said antenna system being arranged to utilize at least one carrier frequency, and including a test antenna, an electrically controlled antenna having at least two modules with control means for the control of transmitted amplitude and phase processing factors for the respective module and means for generating control signals to the control means, said control signals being associated with at least one value of said amplitude and phase processing factors at transmission for the respective module, and each of the modules being arranged with a commandable isolated mode, comprising the following steps:

a) arranging, for each module, a commandable reference mode at transmission, at which the transmitted amplitude and phase processing factors for the module is known; and b) calibrating, at transmission, substantially all the modules for at least one of the carrier frequencies based on an investigation of the transmitted signal by transmitting test signals through the electrically controlled antenna and receiving them through the test antenna, and by transmitting test signals through the electrically controlled antenna and receiving them through the test antenna whereby the effect of an unknown signal influence on the test signals is eliminated by use of the reference modes at transmission for the modules.

30. A method according to claim 29, wherein the step b) in turn comprises the following substeps:

c) selecting one of the carrier frequencies;

d) selecting one of the modules;

e) selecting a first test signal, comprising the selected carrier frequency;

f) transmitting the selected first test signal through the electrically controlled antenna, with the selected module commanded to its reference mode at transmission and with the other modules commanded to their isolated modes;

g) receiving the selected first test signal transmitted through the electrically controlled antenna, through the test antenna, whereby a first received signal, corresponding to the reference mode at transmission for the selected module and the selected first test signal is obtained;

h) comparing the first received signal to the selected first test signal;

i) calibrating, at transmission, the selected module for the selected carrier frequency and at least a value of the commanded amplitude and phase processing factors at transmission for the selected module, using the comparison, according to the substep h), between the first received signal and the selected first test signal, to eliminate the influence of the unknown signal influence; and j) repeating the substeps d) through i) until substantially all the modules have been selected.

31. A method according to claim 30, wherein the step b) in turn comprises the following substep:

k) repeating the substeps c) through j) until a predetermined number of the carrier frequencies has been selected.

32. A method according to claim 30, wherein the substep i) in turn comprises the following substeps:

l) selecting a value for the transmitted amplitude and phase processing factors for the selected module;

m) selecting a second test signal comprising the selected carrier frequency;

n) transmitting the selected second test signal through the electrically controlled antenna with the selected module commanded to its transmission mode with the selected value of the amplitude and phase processing factors at transmission for the selected module and with the other modules commanded to their isolated modes;

o) receiving the selected second test signal transmitted through the electrically controlled antenna through the test antenna, whereby a second received signal, corresponding to the selected value of the amplitude and phase processing factors at transmission for the selected module and the selected second test signal is obtained;

p) comparing the second received signal and the selected second test signal;

q) generating a value corresponding to a amplitude and phase processing factors error at transmission for the selected module corresponding to the selected carrier frequency and the selected value of the amplitude and phase processing factors at transmission for the selected module, this being done in dependence of the comparison, according to the substep h), between the first received signal and the selected first test signal and the comparison, according to the substep p) between the second received signal and the selected second test signal; and r) switching the control signals associated with the selected value of amplitude and phase processing factors at transmission for the selected module to the control means for controlling the transmitted amplitude and phase processing factors for the selected module in dependence of the value corresponding to the transmitted amplitude and phase processing factors for the selected module.

33. A method according to claim 32, wherein the substep i) in turn comprises the following substep:

s) repeating the substeps l) through r) until a predetermined number of values of the amplitude phase processing factors at transmission for the selected module have been selected.

34. A method according to claim 32, wherein the switching of the control signals to the control means in the substep r) implies that this is done in such a way that the phase shift of the selected module at transmission is reduced corresponding to an argument to the amplitude and phase processing factors error at transmission and in such a way that the amplification of the selected module at transmission is changed by a factor corresponding to one divided by the value of the transmitted amplitude and phase processing factors error.

35. A method for the calibration of an antenna system during reception, said antenna system being arranged to utilize at least one carrier frequency, and comprising a test antenna, an electrically controlled antenna having at least two modules with controllable control means for the control of received amplitude and phase processing factors for the module and means for generating control signals to the control means, said control signals being associated with at least one value of amplitude and phase processing factors at reception for the respective module, and each of the modules being arranged with a commandable isolated mode, comprising the following steps:

a) arranging, for each module, a commandable reference mode at transmission, at which the transmitted amplitude and phase processing factors for the module is known; and b) calibrating substantially all the modules at reception for at least one of the carrier frequencies based on an investigation of the received signals by transmitting test signals through the test antenna and receiving them through the electrically controlled antenna, and transmitting test signals through the electrically controlled antenna and receiving them through the test antenna, whereby the effect of an unknown signal influence on the test signals is eliminated by use of the reference modes at reception for the modules.

36. A method according to claim 35, wherein the step b) in turn comprises the following substeps:

c) selecting one of the carrier frequencies;

d) selecting one of the modules as a reference module;

e) selecting a value for the transmitted amplitude and phase processing factors for the reference module as a value for comparison at reception;

f) calibrating of the reference module during reception for the selected carrier frequency in relationship to the received amplitude and phase processing factors for the reference module, corresponding to the selected carrier frequency and the value for comparison at reception; and g) calibrating the reference module at reception for the selected carrier frequency in relationship to the received amplitude and phase processing factors for the reference module, corresponding to the selected carrier frequency and the value for comparison at reception.

37. A method according to claim 36, wherein the step b) in turn also comprises the following substeps:

h) repeating the steps c) through g) until a predetermined number of carrier frequencies have been selected.

38. A method according to claim 36, wherein the step f) in turn comprises the following substeps:

i) selecting a first test signal, comprising the selected carrier frequency;

j) transmitting the selected first test signal through the test antenna;

k) receiving the selected first test signal transmitted through the test antenna, through the electrically controlled antenna with the reference module commanded to its reception mode with the value for comparison at reception and with the other modules commanded to their isolated modes, whereby a first received signal, corresponding to the reference module, the value for comparison at reception and the selected first test signal is obtained;

l) comparing the first received signal and the selected first test signal;

m) calibrating, at reception, the reference module in relationship to the received amplitude and phase processing factors for the reference module, corresponding to the selected carrier frequency and the value for comparison at reception, for the selected carrier frequency and at least one value of the amplitude and phase processing factors at reception for the reference module, utilizing the comparison according to the substep l) of the first received signal and the selected first test signal.

39. A method according to claim 38, wherein the substep m) in turn comprises the following substeps:
- n) selecting a value for the received amplitude and phase processing factors for the reference module;
- o) selecting a second test signal comprising the selected carrier frequency;
- p) transmitting the selected second test signal through the test antenna;
- q) receiving the selected second test signal transmitted through the test antenna through the electrically controlled antenna, with the reference module commanded to reception with the selected value of the amplitude and phase processing factors at reception for the reference module and with the other modules commanded to their isolated modes, whereby a second received signal, corresponding to the selected value of the amplitude and phase processing factors at reception for the module and the selected second test signal is obtained;
- r) comparing the second received signal and the selected second test signal;
- s) generating a value corresponding to a received amplitude and phase processing factors error ratio for the reference module, corresponding to the selected carrier frequency, the selected value of the amplitude and phase processing factors at reception for the reference module and the value for comparison at reception, this being done in dependence of the comparison, according to the substep l), between the first received signal and the selected first test signal and the comparison, according to the substep r) between the second received signal and the selected second test signal; and
- t) switching the control signals associated with the selected value of the amplitude and phase processing factors at reception for the reference module to the control means for controlling the received amplitude and phase processing factors for the reference module, this being done in dependence of the value corresponding to the received amplitude and phase processing factors error ratio for the reference module.

40. A method according to claim 39, wherein the substep m) in turn comprises the following substep:
- u) repeating the substeps n) through t) until a predetermined number of values of the amplitude and phase processing factors at reception for the reference module have been selected.

41. A method according to claim 39, wherein the switching of the control signals to the control means in the substep t) implies that this is done in such a way that the phase shift of the reference module at reception is reduced corresponding to an argument to the received amplitude and phase processing factors error ratio for the reference module and in such a way that the amplification of the reference module at reception is changed by a factor corresponding to one divided by an absolute value of the received amplitude and phase processing factors for the reference module.

42. A method according to claim 36, wherein the step g) in turn comprises the following substeps:
- v) selecting a third test signal, comprising the selected carrier frequency;
- w) transmitting the selected third test signal through the electrically controlled antenna, with the reference module commanded to the reference mode at transmission and with the other modules commanded to their isolated modes;
- x) receiving the selected third test signal transmitted through the electrically controlled antenna, through the test antenna, whereby a third received signal, corresponding to the reference mode at transmission for the reference module and the selected third test signal is obtained;
- y) comparing the third received signal and the third test signal;
- z) selecting a fourth test signal comprising the selected carrier frequency;
- aa) transmitting the selected fourth test signal through the test antenna;
- ab) receiving the fourth test signal, transmitted from the test antenna by the electrically controlled antenna, with the reference module commanded to reception mode with the value for comparison at reception and with the other modules commanded to their isolated modes; whereby a fourth received signal, corresponding to the reference module, the value for comparison at transmission and the first test signal are obtained;
- ac) comparing the fourth received signal to the selected fourth test signal;
- ad) selecting one of the modules in addition to the reference module;
- ae) calibrating the selected module at reception in relationship to the amplitude and phase processing factors of the reference module, corresponding to the selected carrier frequency and the value for comparison at reception, for the selected carrier frequency and at least one value of the amplitude and phase processing factors at reception for the selected module, utilizing the comparison, according to the substep y), of the third received signal and the third test signal to eliminate the effects of the unknown signal influence; and
- af) repeating the substeps ab) and ac) until substantially all the modules have been selected.

43. A method according to claim 42, wherein the substep ac) in turn comprises the following substeps:
- ag) selecting a fifth test signal
- ah) transmitting the selected fifth test signal through the electrically controlled antenna with the selected module commanded to its reference mode at transmission, and with the other modules commanded to their isolated modes;
- ai) receiving the selected fifth test signal transmitted through the electrically controlled antenna through the test antenna, whereby a fifth received signal, corresponding to the reference mode at transmission for the selected module and the selected fifth test signal is obtained;
- aj) comparing the fifth received signal and the selected fifth test signal;
- ak) selecting a value of the amplitude and phase processing factors at reception for the selected module;
- al) selecting a sixth test signal comprising the selected carrier frequency;
- am) transmitting the selected sixth test signal through the test antenna;
- an) receiving the selected sixth test signal transmitted through the test antenna, through the electrically controlled antenna with the selected module commanded to its reception mode with the selected value of the amplitude and phase processing factors at reception for the selected module and with the other modules commanded to their isolated modes, whereby a sixth received signal, corresponding to the reference mode at reception for the selected module and the selected sixth test signal is obtained;

ao) comparing the sixth received signal and the selected sixth test signal;

ap) generating a value corresponding to a received amplitude and phase processing factors' error ratio for the selected module corresponding to the selected carrier frequency and the selected value of the amplitude and phase processing factors at reception for the selected module, and the value for comparison at reception, this being done in dependence of the comparison, according to the substep y), between the third received signal and the selected third test signal, the comparison according to the substep ac) of the fourth received signal and the selected fourth test signal, the comparison according to the substep aj) of the fifth received signal and the selected fifth test signal and the comparison, according to the substep ao) between the sixth received signal and the selected sixth test signal; and aq) switching the control signals associated with the selected value of the commanded amplitude and phase processing factors at reception for the selected module to the control means for controlling the received amplitude and phase processing factors for the selected module, this being done in dependence of the value corresponding to the transmitted amplitude and phase processing factors' error ratio for the selected module.

44. A method according to claim 43, wherein the substep ac) in turn comprises the following substep:

ar) repeating the substeps ak) through aq) until a predetermined number of values of the amplitude and phase processing factors at reception for the selected module.

45. A method according to claim 43, wherein the switching of the control signals to the control means in the substep ao) implies that the control signals are switched in such a way that the phase shift of the selected module at reception is reduced corresponding to an argument to the amplitude and phase processing factors' error ratio for the selected module at reception and in such a way that the amplification of the selected module at reception is changed by a factor corresponding to one divided by the value of the transmitted amplitude and phase processing factors' error ratio for the selected module.

46. A self calibrating antenna system arranged to utilize at least one carrier frequency, comprising a test antenna;

an electrically controlled antenna having at least two modules with control means for the control of a received amplitude and phase processing factors for the respective module, each module being arranged with a commandable isolated mode, in which mode the module substantially does not let signals through;

means for generating control signals to the control means, said control signals to the control means being associated with at least one value of amplitude and phase processing factors at reception for the respective module;

means for generating test signals, said antenna system being arranged in such a way that the test signals are transmitted through the test antenna;

a receiver, arranged to receive the test signals as well as signals received through the electrically controlled antenna, wherein each module is arranged with a commandable reference mode at reception, at which the received amplitude and phase processing factors for the module is known; and that the antenna system is arranged for calibrating at reception of substantially all the modules based on an investigation of the received signals for the modules by transmitting test signals through the test antenna and receiving them through the electrically controlled antenna by the receiver, said antenna system being arranged to eliminate the effect of an unknown signal influence on the test signals by use of the reference modes at reception for the modules.

47. A self calibrating antenna system according to claim 46, wherein the antenna system comprises memory means, said memory means comprising data describing the received amplitude and phase processing factors for each module as a function of frequency and temperature, corresponding to predetermined settings of the control signals to the control means for controlling the received amplitude and phase processing factors for the module, and that the antenna system comprises at least one temperature measuring device.

48. A self calibrating antenna system according to claim 46, wherein each module comprises a reference device, for example a transmission conductor;

that each module comprises controllable switches arranged in such a way that electronic circuitry in the module may be bypassed through the reference device;

that the antenna system comprises memory means, said memory means comprising data describing the received amplitude and phase processing factors for each module, when the electronic circuitry in the module is bypassed through the reference device, as a function of the frequency and the temperature; and that the antenna system comprises at least one temperature measuring device.

49. A self calibrating antenna system arranged to utilize at least one carrier frequency, comprising a test antenna;

an electrically controlled antenna comprising at least two modules having control means for controlling transmitted amplitude and phase processing factors for the respective module, each module being arranged with a commandable isolated mode, in which the module substantially does not let any signals through;

means for generating control signals to the control means, said control signals to the control means being associated with at least one value of a commanded amplitude and phase processing factors at transmission for the respective module;

means for generating test signals, said antenna system being arranged in such a way that the test signals can be transmitted on command either through the test antenna or through the electrically controlled antenna;

a receiver, arranged to receive the test signals and, on command, to receive signals either through the test antenna or the electrically controlled antenna, wherein each module is arranged with a commandable reference mode at reception, at which the amplitude and phase processing factors of the module is known; and that the antenna system is arranged for calibration at reception of substantially all the modules for at least one of the carrier frequencies based on an investigation of the transmitted signals at transmission for the modules by transmitting test signals through the test antenna and receiving them through the electrically controlled antenna, and by transmitting test signals through the electrically controlled antenna and receiving them through the test antenna of the receiver, said antenna system being arranged to eliminate the effect of an unknown signal influence on the test signals by use of the reference modes at reception for the modules.

50. A self calibrating antenna system arranged to utilize at least one carrier frequency, comprising:

a test antenna;

an electrically controlled antenna having at least two modules with control means for the control of received amplitude and phase processing factors for the respective module, each module being arranged with a commandable isolated mode, at which the module substantially does not let signals through;

means for generating control signals to the control means, said control signals being associated with at least one value of amplitude and phase processing factors at reception for the respective module;

means for generating test signals, said antenna system being arranged in such a way that the test signals are transmitted through the electrically controlled antenna;

a receiver, arranged to receive the test signals as well as signals received through the electrically controlled antenna, wherein each module is arranged with a commandable reference mode at transmission, at which the transmitted amplitude and phase processing factors for the module is known; and that the antenna system is arranged for calibrating, at transmission, substantially all the modules based on an investigation of the transmitted signals at transmission for the modules by transmitting test signals through the electrically controlled antenna and receiving them through the test antenna by the receiver, said antenna system being arranged to eliminate the effect of an unknown signal influence on the test signals is eliminated by use of the reference modes at transmission for the modules.

51. A self calibrating antenna system according to claim 50, wherein the antenna system comprises memory means, said memory means comprising data describing the transmitted amplitude and phase processing factors for each module as a function of frequency and temperature, corresponding to predetermined settings of the control signals to the control means for controlling the transmitted amplitude and phase processing factors for the module and that the antenna system comprises at least one temperature measuring device.

52. A self calibrating antenna system according to claim 50, wherein each module comprises a reference device, for example a transmission conductor;

that each module comprises controllable switches arranged in such a way that electronic circuitry in the module may be bypassed through the reference device;

that the antenna system comprises memory means, said memory means comprising data describing the transmitted amplitude and phase processing factors for each module, when the electronic circuitry in the module is bypassed through the reference device, as a function of the frequency and the temperature; and that the antenna system comprises at least one temperature measuring device.

53. A self calibrating antenna system arranged to utilize at least one carrier frequency, comprising:

a test antenna;

an electrically controlled antenna comprising at least two modules having control means for controlling received amplitude and phase processing factors for the respective module, each module being arranged with a commandable isolated mode, in which the module substantially does not let any signals through;

means for generating control signals to the control means, said control signals to the control means being associated with at least one value of amplitude and phase processing factors at reception for the respective module;

means for generating test signals, said antenna system being arranged in such a way that the test signals on command can be transmitted either through the test antenna or through the electrically controlled antenna;

a receiver, arranged to receive the test signals and, on command, to receive signals either through the test antenna or the electrically controlled antenna, wherein each module is arranged with a commandable reference mode at transmission, in which the amplitude and phase processing factors of the module are known; and that the antenna system is arranged for calibration of substantially all the modules at reception for at least one of the carrier frequencies based on an investigation of the transmitted signals at transmission for the modules by transmitting test signals through the test antenna and receiving them through the electrically controlled antenna by the receiver, and by transmitting test signals through the electrically controlled antenna and receiving them through the test antenna of the receiver said antenna system being arranged to eliminate the effect of an unknown signal influence on the test signals by use of the reference modes at reception for the modules.

54. A method for calibrating an antenna system comprising the steps of:

transmitting, from a test antenna, a test signal at a selected carrier frequency;

subjecting the transmitted test signal to distortion;

receiving, at said antenna system, said distorted test signal;

processing said received test signal at a selected processing module within said antenna system using a predetermined amplitude and phase factor associated with a reference mode of said selected processing module to generate a processed test signal;

comparing said test signal with said processed test signal; and calibrating said antenna system to mitigate said distortion based on a result of said comparison.

55. The method of claim 54, further comprising the steps of:

providing said selected module with a variable attenuator and a variable phase shifter; and processing said received test signal by setting said variable attenuator and said variable phase shifter using said predetermined amplitude and phase factor being retrieved from a memory device within said antenna system.

56. The method of calibrating an antenna system according to claim 55, further comprising the steps of:

arranging the modules with reference modes by making a survey of the amplitude and phase factors for the processing modules as a function of temperature and frequency; and arranging at least one temperature measuring device in the antenna system.

* * * * *